US012118633B1

(12) United States Patent
Waddell

(10) Patent No.: US 12,118,633 B1
(45) Date of Patent: Oct. 15, 2024

(54) REAL ESTATE INVESTMENT NETWORKED PLATFORM

(71) Applicant: Capdex, Inc., Los Angeles, CA (US)

(72) Inventor: Grant Waddell, Los Angeles, CA (US)

(73) Assignee: Capdex, Inc., Los Angeles, CA (US)

( * ) Notice: Subject to any disclaimer, the term of this patent is extended or adjusted under 35 U.S.C. 154(b) by 0 days.

(21) Appl. No.: 18/465,421

(22) Filed: Sep. 12, 2023

(51) Int. Cl.
*G06Q 50/163* (2024.01)

(52) U.S. Cl.
CPC .................. *G06Q 50/163* (2013.01)

(58) Field of Classification Search
None
See application file for complete search history.

(56) References Cited

U.S. PATENT DOCUMENTS

| | | | | |
|---|---|---|---|---|
| 5,032,989 | A * | 7/1991 | Tornetta | G06Q 50/16 345/667 |
| 7,546,268 | B1 * | 6/2009 | DiGiovanni | G06Q 40/04 705/37 |
| 11,250,486 | B1 * | 2/2022 | Leveau | G06F 16/9535 |
| 2002/0073006 | A1 * | 6/2002 | Goldman | G06Q 40/00 705/35 |
| 2006/0080114 | A1 * | 4/2006 | Bakes | G06Q 50/16 705/1.1 |
| 2006/0190277 | A1 * | 8/2006 | Zimmerman | G06Q 30/0645 705/26.1 |
| 2007/0039023 | A1 * | 2/2007 | Kataoka | H04N 21/47 725/35 |
| 2010/0131426 | A1 * | 5/2010 | Kroutik | G06Q 40/00 705/37 |
| 2013/0246310 | A1 * | 9/2013 | Weiss | G06Q 40/06 705/36 T |
| 2016/0328810 | A1 * | 11/2016 | Chaillan | G06Q 50/165 |
| 2019/0073722 | A1 * | 3/2019 | Obradovic | G06Q 40/06 |
| 2019/0156415 | A1 * | 5/2019 | Yen | G06Q 20/10 |

OTHER PUBLICATIONS

Retrieved from https://gparency.com/ on Sep. 12, 2023; 8 pgs.
Retrieved from https://www.palico.com/ on Sep. 12, 2023; 4 pgs.
Retrieved from https://www.crowdstreet.com/ on Sep. 12, 2023; 5 pgs.
Retrieved from https://www.realtymogul.com/ on Sep. 12, 2023; 6 pgs.
Retrieved from https://www.yieldstreet.com/ on Sep. 12, 2023; 7 pgs.
Retrieved from https://www.reverecre.com/ on Sep. 12, 2023; 7 pgs.

* cited by examiner

*Primary Examiner* — Dennis W Ruhl
(74) *Attorney, Agent, or Firm* — Reed Smith LLP; Gerard M. Donovan; Anupma Sahay

(57) ABSTRACT

Methods, apparatuses, and computer-readable media for a networked platform for searching for a property are provided. The method can include receiving and storing a plurality of property features, a plurality of privacy features, and a plurality of user features; generating a private interface based on the plurality of property features, the private interface comprising a property post based on the plurality of property features; associating the privacy features and the user features; and revealing the property post to the second user in the private interface such that the property post is visible to the second user in the private interface.

20 Claims, 30 Drawing Sheets

FIG. 3

CRE CONNECT

222 \ 224 \ 230 \
Sponsor   ~~~~~   ~~~~~

Investment Summary

The property is a Class A, stabilized new construction office with 95% occupancy. It is centrally located in the business district.

Capital

214 \ LOOKING FOR: Equity
216 \ AMOUNT: $500,000,000
215 \ ADDITIONAL DETAILS: LP equity 210 \ Property Type

Office

212 \ Investment Strategy

Core

| 202 | 207 | 209 | 211 | 213 | 217 | 221 |
|---|---|---|---|---|---|---|
| Land Area | Zoning | Current FAR | Buildable FAR | Rentable Square Footage | Buildings | Units |
| 78,298 Sq Ft | C-2 | 1.4 | 2 | 2,130,849 Sq Ft | 1 | 200 |

Parking 219   WALT 203
232 Spaces   5.5 Years

206 \ Description

The property is located in Union City, AK, and is a stabilized office building with 95% occupancy.

242 \ CREconnect
Founder

Picture

Name

Contact

240 \
244 \ Name
246 \ Email
248 \ Phone
250 \ Firm
251 \ Message

Reveal the property post to the second user in the private interface such that the property post is visible to the second user in the private interface based on compliance by the second user with the plurality of privacy features.
1405

Store one or more user features corresponding to the second user, the one or more user features comprising a capital characteristic comprising a resource value.
1406

Generate a contact form corresponding to the property post, the contact form configured to send a message from the second user to the general user regarding the property.
1407

Match the property post with one or more filters for searching for the property, the one or more filters comprising at least one of a property type characteristic corresponding to a property usage for the property, an investment strategy characteristic corresponding to a risk and return characteristic for the property.
1411

Match the property usage with a second user property type characteristic in the database.
1411

FIG. 15

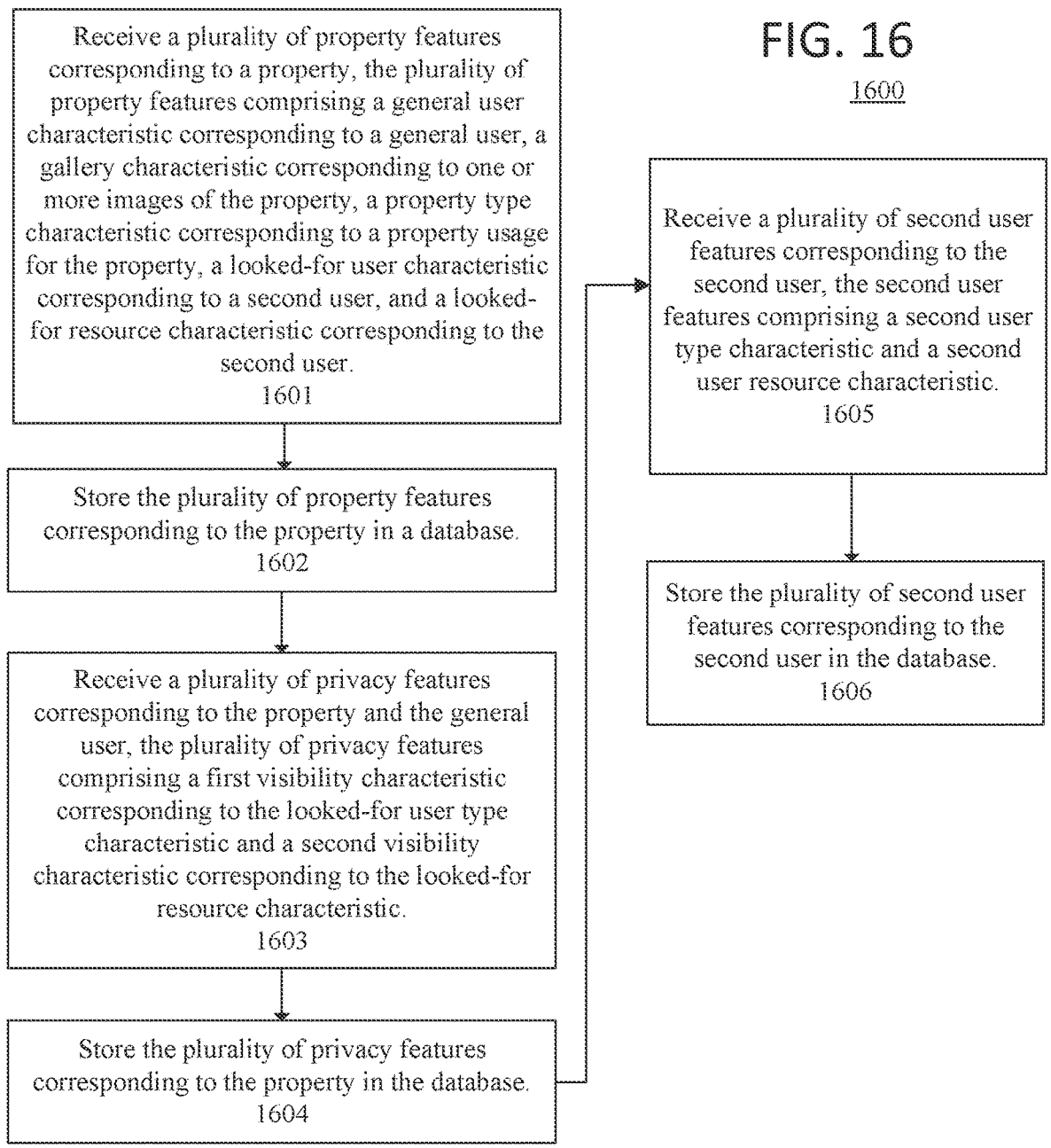

```
Receive a plurality of third user features
corresponding to a third user, the user features
comprising a third user type characteristic and a
third user resource characteristic.
1617
```

```
Store the plurality of third user features
corresponding to the third user in the database.
1618
```

```
Arrange the stored plurality of third user
features in the database such that the stored
plurality of third user features can be associated
with the stored plurality of privacy features and
the stored plurality of property features in the
database.
1619
```

```
Associate the first visibility characteristic with
the third user type characteristic, and the second
visibility characteristic with the third user
resource characteristic in the database.
1620
```

```
Generate a contact form corresponding to the
property post, the contact form configured to
send a message from the second user to the
general user regarding the property.
1621
```

```
Receive a plurality of contact
form features corresponding to the
second user features, the plurality
of contact form sender features
comprising a name characteristic
corresponding to a name of the
second user, an address
characteristic corresponding to an
address of the second user, and a
phone number characteristic
corresponding to a phone number
of the second user.
1622
```

```
Store the plurality of contact form
features in a contact form
database.
1623
```

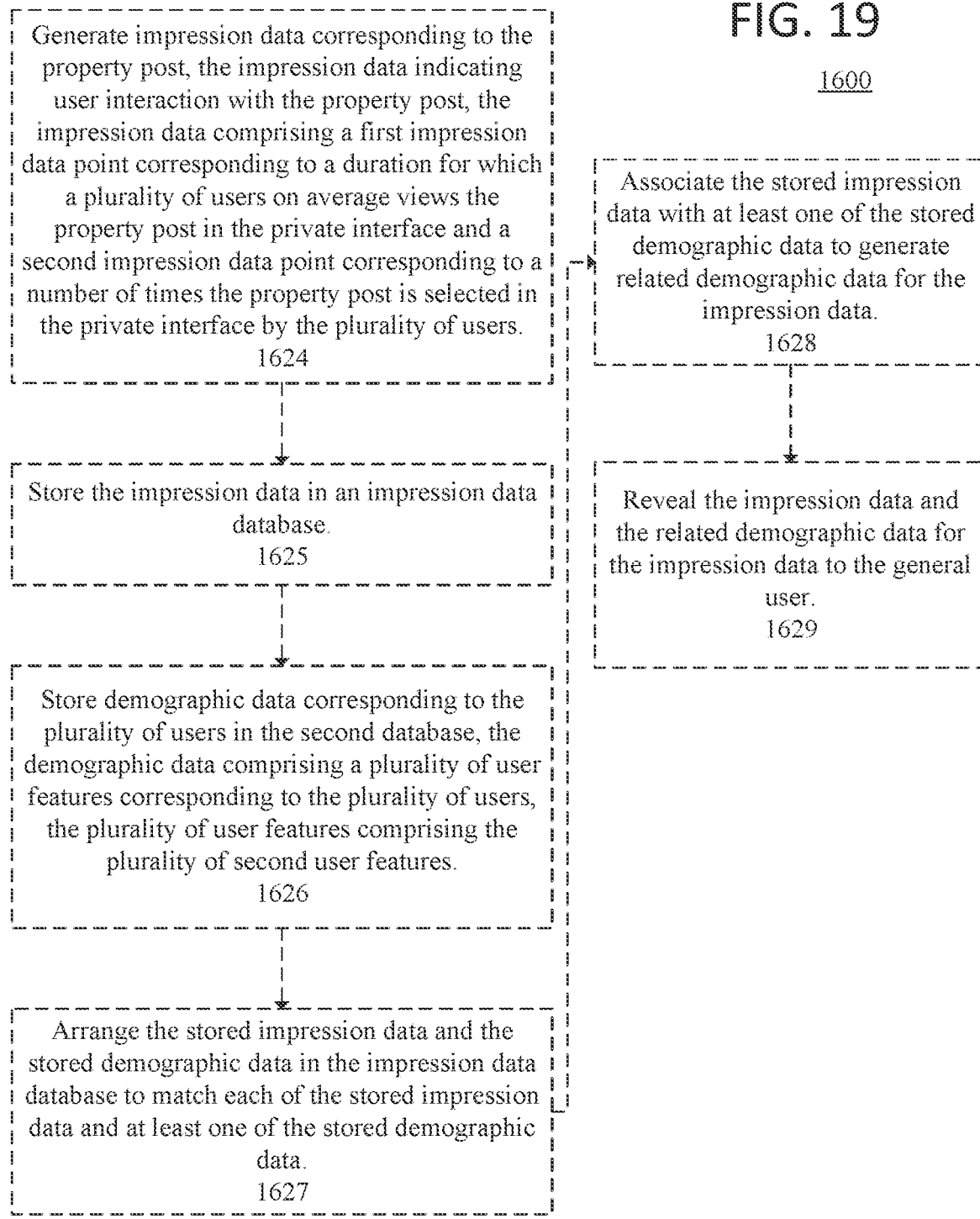

Home > My Deals > Add New Deal
Add New Deal 162

302 — Basics   334 — Financials   340 — Gallery   342 — History

Sources & Uses

Enter numbers without thousands separators. Example: 1000000.00

Sources 336

Sources Line Item                                    Amount

Add Sources

Total Sources

Uses 338

Uses Line Item                                       Amount

Add Uses

Total Uses

Previous                                                                                              Next

REAL ESTATE INVESTMENT NETWORKED PLATFORM

FIELD

This disclosure relates generally to technological advances relating to real estate investments, particularly facilitating connections to finance real estate over a novel networked platform.

BACKGROUND

The real estate industry finances property developments from debt and equity investments. Historically, property developers have sourced investments from relationships and handshakes. Alternatively, developers leverage capital markets brokers that take payment and make personal visits or phone calls to find investments. These manual processes can be time-consuming, costly, and inefficient for an industry as large as real estate. In addition, investors wanting to connect with property developers have depended on these manual processes, limiting their ability to identify and finance appropriate deals.

Technological advances have sought to automate areas of real estate financing, from finding investments to closing deals. Some systems attempt to automate the entire real estate transaction, from connecting property developers and investors to facilitating workflows and executing an investment deal. These systems collect significant data from selling parties, including exhaustive details on the developer and the property for which the developer is seeking investment. From buying parties, these systems collect exhaustive details on criteria for deals or selling parties they are interested in engaging. The collected data is then analyzed to pair potential partners, inform investors of suitable deals for their criteria, and create data sets and models for review by potential investors. However, by requiring property developers to provide significant data to inform investors of suitable deals, these systems jeopardize the confidentiality sought by property developers. Indeed, property developers prefer to disclose limited information to prevent competitors from learning about their financing needs and to source the best investments. Further, these systems minimize the ability of property developers to find suitable investors by only sorting properties for deals based on buying party criteria. Accordingly, these systems present a networking database for discourse around deals that is one-sided from the perspective of the buying parties.

Many systems facilitate micro-investing to crowdfund investments. Crowdfund investments can be sourced to fill small remaining amounts of capital. These systems allow new investors, or investors that have smaller portfolios or less investing experience, to enter the market. Property developers may be required to disclose property data that would be viewed by several potential crowdfunding users. This data is also used to create data sets and models that can be viewed by several potential crowdfunding users. Some property developers do not prefer crowdsourcing and instead want investors that finance deals within a certain capital range, which may be larger than the funding provided by individuals in crowdfunding systems. Crowdfunding systems also jeopardize the confidentiality sought by property developers by revealing property information to many parties. Further, smaller value investments capitalizing large-size commercial deals is inefficient and ineffective.

Accordingly, a need exists for improvements in systems and methods for searching for a property for investment.

BRIEF DESCRIPTION OF THE DRAWINGS

Example embodiments in accordance with this disclosure will now be described with reference to the attached figures.

FIG. 3 illustrates a dashboard of the real estate networked platform of FIG. 1.

FIG. 9 illustrates the property post of FIG. 8.

FIG. 15 illustrates a flowchart of the method of FIG. 14.

FIG. 16 illustrates a flowchart of a method of searching for a property according to exemplary embodiment.

FIG. 18 illustrates a flowchart of the method of FIG. 16.

FIG. 19 illustrates a flowchart of the method of FIG. 16.

FIG. 21 illustrates an add deal interface of the real estate networked platform of FIG. 1.

FIG. 22 illustrates the add deal interface of FIG. 21.

FIG. 24 illustrates the add deal interface of FIG. 21.

FIG. 28 illustrates a profile interface of the real estate networked platform of FIG. 1.

SUMMARY

Figure 1:
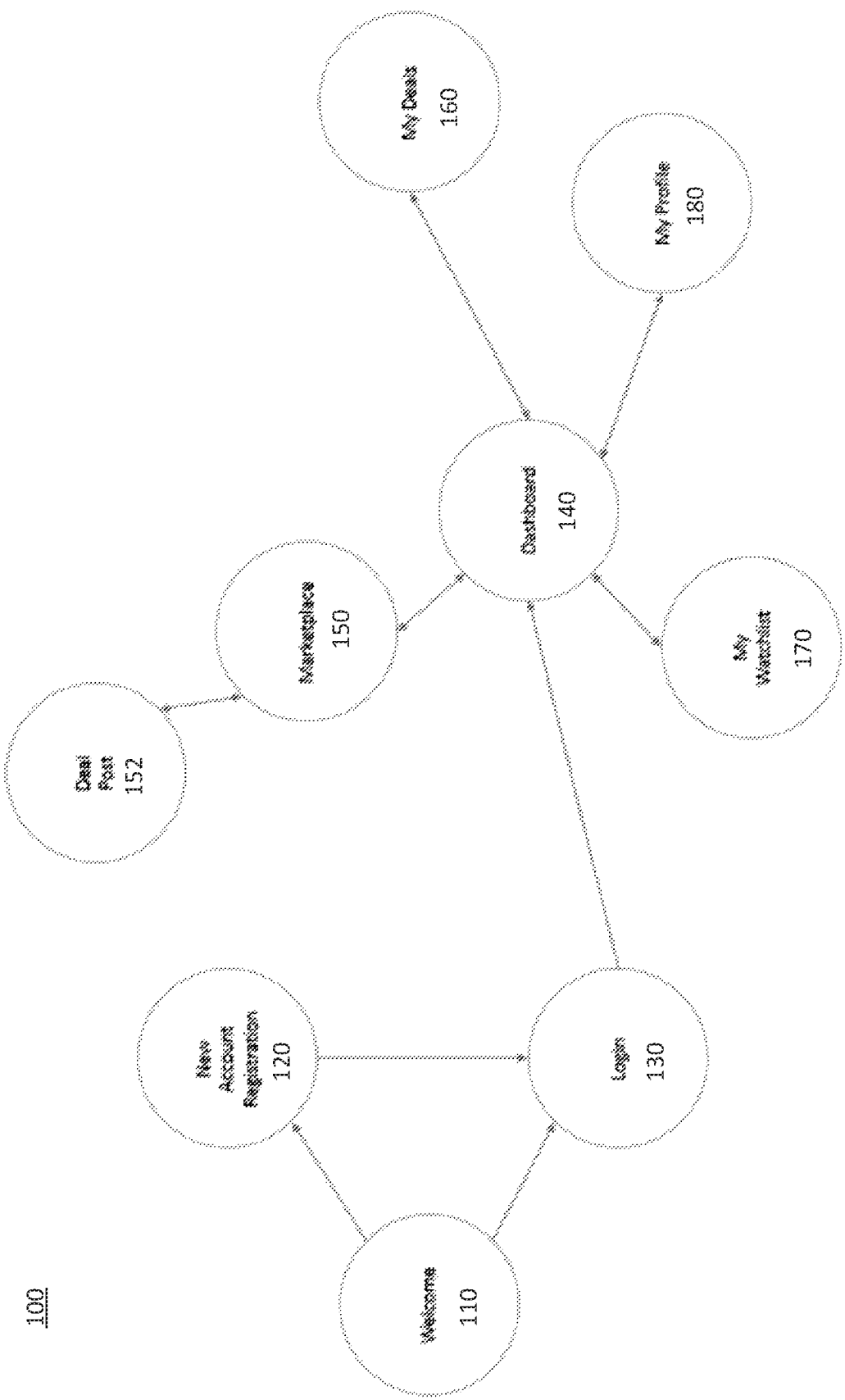
FIG. 1 illustrates a user interface organization of a real estate networked platform according to an exemplary embodiment.

Embodiments provide a method executed by one or more computing devices of searching for a property. The method can include storing a plurality of property features corresponding to the property. The plurality of property features can include a general user characteristic corresponding to a general user, a description characteristic corresponding to a description of the property, a property type characteristic corresponding to a property usage for the property, an investment strategy characteristic corresponding to a risk and return characteristic for the property, a looked-for user type characteristic corresponding to a second user acceptable by the general user, and a looked-for resource characteristic corresponding to a resource characteristic of the second user. The method can also include generating a private interface based on the plurality of property features, the private interface including a property post based on the plurality of property features, the private interface being accessible to the second user; and generating a contact form corresponding to the property post, the contact form configured to send a message from the second user to the general user regarding the property.

In some embodiments, the plurality of property features can also include a financial characteristic corresponding to financial information regarding the property, the financial information including sources of financing and uses of financing.

In some embodiments, the plurality of property features also includes a gallery characteristic corresponding to one or more images of the property.

In some embodiments, the method also includes storing a plurality of privacy features corresponding to the property, the plurality of privacy features including a first visibility characteristic corresponding to the looked-for user characteristic and a second visibility characteristic corresponding to the looked-for resource characteristic.

In some embodiments, the second user complies with the plurality of privacy features such that the property post is visible to the second user in the private interface. In some embodiments, the second user is at least one of an equity resource user or a debt resource user. In some embodiments, the private interface is accessible to a third user, and the third user does not comply with at least one of the plurality of privacy features such that the property post is not visible to the third user in the private interface. In some embodiments, the private interface is accessible to a fourth user, and the fourth user complies with the plurality of privacy features such that the property post is visible to the fourth user in the private interface.

In some embodiments, the second user is an equity resource user.

In some embodiments, the second user is a debt resource user.

In some embodiments, generating a contact form corresponding to the property post, the contact form configured to send a message from the second user to the general user regarding the property includes storing a plurality of contact form sender details corresponding to the contact form. The plurality of contact form sender details can include a name characteristic corresponding to a name of the second user, an email address characteristic corresponding to an email address of the second user, a phone number characteristic corresponding to a phone number of the second user, and a firm characteristic corresponding to a firm of the second user.

Embodiments provide a method executed by one or more computing devices of searching for a property of a general user. The method can include storing a plurality of property features corresponding to the property. The plurality of property features can include a looked-for user type characteristic corresponding to a second user and a looked-for resource characteristic corresponding to a resource characteristic of the second user. The method can also include storing a plurality of privacy features corresponding to the property, the plurality of privacy features including a first visibility characteristic corresponding to the looked-for user characteristic and a second visibility characteristic corresponding to the looked-for resource characteristic. The method can also include identifying the second user as an acceptable resource user, the acceptable resource user being in compliance with the plurality of privacy features; generating a private interface based on the one or more property features, the private interface including a property post including the plurality of property features, and the private interface being accessible to the second user; and revealing the property post to the second user in the private interface such that the property post is visible to the second user in the private interface based on compliance by the second user with the plurality of privacy features.

In some embodiments, the looked-for user characteristic is an equity resource user, and the second user is an equity resource user.

In some embodiments, the method also includes storing one or more user features corresponding to the second user, the one or more user features including a resource characteristic including a resource value. The looked-for resource characteristic can be a range including the resource value.

In some embodiments, generating a private interface based on the one or more property features includes verifying the plurality of property features was stored within a threshold time period; and generating the property post based on the verification. In some embodiments, the method includes removing the property post from the private interface when the threshold time period is met.

In some embodiments, revealing the property post to the second user in the private interface includes matching the property post with one or more filters for searching for the property, the one or more filters including at least one of a property type characteristic corresponding to a property usage for the property, an investment strategy characteristic corresponding to a risk and return characteristic for the property. The plurality of property features further can include the property type characteristic and the investment strategy characteristic.

In some embodiments, the method also includes generating a contact form corresponding to the property post, the contact form configured to send a message from the second user to the general user regarding the property.

Embodiments provide an apparatus for searching for a property. one or more processors; and one or more memories operatively coupled to at least one of the one or more processors and having instructions stored thereon that, when executed by at least one of the one or more processors, cause at least one of the one or more processors: store a plurality of property features corresponding to the property, the plurality of property features including a general user characteristic corresponding to a general user, a description characteristic corresponding to a description of the property, a property type characteristic corresponding to a property usage for the property, an investment strategy characteristic corresponding to a risk and return characteristic for the property, a looked-for user type characteristic corresponding to a second user acceptable by the general user, and a looked-for resource characteristic corresponding to a resource characteristic of the second user; generate a private interface based on the plurality of property features, the private interface including a property post including the plurality of property features, the private interface being accessible to the second user; and generate a contact form corresponding to the property post, the contact form configured to send a message from the second user to the general user regarding the property.

Embodiments provide at least one non-transitory computer-readable medium storing computer-readable instructions for searching for a property that, when executed by one or more computing devices, cause at least one of the one or more computing devices to: store a plurality of property features corresponding to the property, the plurality of property features including a general user characteristic corresponding to a general user, a description characteristic corresponding to a description of the property, a property type characteristic corresponding to a property usage for the property, an investment strategy characteristic corresponding to a risk and return characteristic for the property, a looked-for user type characteristic corresponding to a second user acceptable by the general user, and a looked-for resource characteristic corresponding to a resource characteristic of the second user; generate a private interface based on the plurality of property features, the private interface including a property post including the plurality of property features, the private interface being accessible to the second user; and generate a contact form corresponding to the property post, the contact form configured to send a message from the second user to the general user regarding the property.

Embodiments provide an apparatus for searching for a property of a general user. The apparatus can include one or more processors; and one or more memories operatively coupled to at least one of the one or more processors and having instructions stored thereon that, when executed by at least one of the one or more processors, cause at least one of the one or more processors: store a plurality of property features corresponding to the property, the plurality of property features including a looked-for user type characteristic corresponding to a second user and a looked-for resource characteristic corresponding to a resource characteristic of the second user; store a plurality of privacy features corresponding to the property, the plurality of privacy features including a first visibility characteristic corresponding to the looked-for user type characteristic and a second visibility characteristic corresponding to the looked-for resource characteristic; identify the second user as an acceptable resource user, the acceptable resource user being in compliance with the plurality of privacy features; generate a private interface based on the one or more property features, the private interface including a property post including the plurality of property features, and the private interface being accessible to the second user; and reveal the property post to the second user in the private interface such that the property post is visible to the second user in the private interface based on compliance by the second user with the plurality of privacy features.

Embodiments provide at least one non-transitory computer-readable medium storing computer-readable instructions for searching for a property of a general user that, when executed by one or more computing devices, cause at least one of the one or more computing devices to: store a plurality of property features corresponding to the property, the plurality of property features including a looked-for user type characteristic corresponding to a second user and a looked-for resource characteristic corresponding to a resource characteristic of the second user; store a plurality of privacy features corresponding to the property, the plurality of privacy features including a first visibility characteristic corresponding to the looked-for user type characteristic and a second visibility characteristic corresponding to the looked-for resource characteristic; identify the second user as an acceptable resource user, the acceptable resource user being in compliance with the plurality of privacy features; generate a private interface based on the one or more property features, the private interface including a property post including the plurality of property features, and the private interface being accessible to the second user; and reveal the property post to the second user in the private interface such that the property post is visible to the second user in the private interface based on compliance by the second user with the plurality of privacy features.

Embodiments provide a method executed by one or more computing devices of searching for a real estate property based on matching user, privacy, and property features. The method can include receiving a plurality of property features corresponding to a property, the plurality of property features comprising a general user characteristic corresponding to a general user, a gallery characteristic corresponding to one or more images of the property, a property type characteristic corresponding to a property usage for the property, a looked-for user characteristic corresponding to a second user, and a looked-for resource characteristic corresponding to the second user. The method can also include storing the plurality of property features corresponding to the property in a database. The method can also include receiving a plurality of privacy features corresponding to the property and the general user, the plurality of privacy features comprising a first visibility characteristic corresponding to the looked-for user type characteristic and a second visibility characteristic corresponding to the looked-for resource characteristic. The method can also include storing the plurality of privacy features corresponding to the property in the database. The method can also include receiving a plurality of second user features corresponding to the second user, the second user features comprising a second user type characteristic and a second user resource characteristic. The method can also include storing the plurality of second user features corresponding to the second user in the database. The method can also include generating a private interface based on the plurality of property features, the private interface comprising a property post based on the plurality of property features, the private interface being visible to the second user, the plurality of privacy features configured to limit visibility of the property post in the private interface. The method can also include associating the stored plurality of privacy features with the stored plurality of property features in the database. The method can also include arranging the plurality of stored plurality of second user features in the database such that the stored plurality of second user features can be associated with the stored plurality of privacy features and the stored plurality of property in the database. The method can also include associating the first visibility characteristic with the second user type characteristic, and the second visibility characteristic with the second user resource characteristic in the database. The method can also include revealing the property post to the second user in the private interface such that the property post is visible to the second user in the private interface.

In some embodiments, the first visibility characteristic matches with the second user type characteristic such that the property post is visible to the second user in the private interface.

In some embodiments, the second visibility characteristic matches with the second user resource characteristic such that the property post is visible to the second user in the private interface.

In some embodiments, the method further includes receiving a plurality of third user features corresponding to a third user, the user features comprising a third user type characteristic and a third user resource characteristic; storing the plurality of third user features corresponding to the third user in the database; and arranging the stored plurality of third user features in the database such that the stored plurality of third user features can be associated with the stored plurality of privacy features and the stored plurality of property features in the database. The looked-for user type characteristic can further correspond to a third user and the looked-for resource characteristic can further correspond to the third user. The private interface can be visible to the third user.

In some embodiments, the method further includes associating the first visibility characteristic with the third user type characteristic, and the second visibility characteristic with the third user resource characteristic in the database. The first visibility characteristic can match with the third user type characteristic. The second visibility characteristic cannot match with the third user resource characteristic in the database. The property post cannot be visible to the third user in the private interface in the database.

In some embodiments, the method further includes associating the first visibility characteristic with the third user type characteristic, and the second visibility characteristic with the third user resource characteristic in the database. The first visibility characteristic cannot match with the third user type characteristic. The second visibility characteristic can match with the third user resource characteristic in the database. The property post cannot be visible to the third user in the private interface in the database.

In some embodiments, the method further includes associating the first visibility characteristic with the third user type characteristic, and the second visibility characteristic with the third user resource characteristic in the database. The first visibility characteristic can match with the third user type characteristic. The second visibility characteristic can match with the third user resource characteristic in the database. The property post can be visible to the third user in the private interface in the database.

In some embodiments, the method further includes generating a contact form corresponding to the property post, the contact form configured to send a message from the second user to the general user regarding the property. In some embodiments, generating a contact form corresponding to the property post includes receiving a plurality of contact form features corresponding to the second user features, the plurality of contact form sender features comprising a name characteristic corresponding to a name of the second user, an address characteristic corresponding to an address of the second user, and a phone number characteristic corresponding to a phone number of the second user; and storing the plurality of contact form features in a contact form database. The second user features can include the name, the address, and the phone number of the second user.

In some embodiments, the looked-for user characteristic is an equity resource user and the second user is an equity resource user.

In some embodiments, the second user resource characteristic includes a resource value and the looked-for resource characteristic is a range comprising the resource value.

In some embodiments, generating a private interface based on the one or more property features includes verifying the plurality of property features was stored within a threshold time period; and generating the property post based on the verification.

In some embodiments, the method further includes removing the property post from the private interface when the threshold time period is met.

In some embodiments, revealing the property post to the second user in the private interface includes matching the property post with one or more filters for searching for the property, the one or more filters comprising a property type characteristic corresponding to a property usage characteristic for the property.

In some embodiments, revealing the property post to the second user in the private interface includes matching the property usage with a second user property type characteristic in the database. The second user features can include the second user property type characteristic.

In some embodiments, the method further includes generating impression data corresponding to the property post, the impression data indicating user interaction with the property post, the impression data comprising a first impression data point corresponding to a duration for which a plurality of users on average views the property post in the private interface and a second impression data point corresponding to a number of times the property post is selected in the private interface by the plurality of users; and storing the impression data in an impression data database. The second user can be one of the plurality of users. Selecting the property post in the private interface can display the plurality of property features. In some embodiments, the impression data is displayed in the private interface. In some embodiments, the method further includes storing demographic data corresponding to the plurality of users in the second database, the demographic data comprising a plurality of user features corresponding to the plurality of users, the plurality of user features comprising the plurality of second user features; arranging the stored impression data and the stored demographic data in the impression data database to match each of the stored impression data and at least one of the stored demographic data; associating the stored impression data with at least one of the stored demographic data to generate related demographic data for the impression data; and revealing the impression data and the related demographic data for the impression data to the general user.

DETAILED DESCRIPTION

While methods, apparatuses, and computer-readable media are described herein by way of examples and embodiments, those skilled in the art recognize that methods, apparatuses, and computer-readable media for providing and interfacing with a novel real estate investment network platform are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the words "can" and "may" are used in a permissive sense (i.e., meaning having the potential to) rather than the mandatory sense (i.e., meaning must). Similarly, the words "include," "including," and "includes" mean including, but not limited to.

Real estate property developments require significant investment to start up and maintain. Developers seek to connect with investors for financing, and investors seek to connect with developers to build their asset portfolios. However, the real estate industry is historically driven by relationships built organically, which can exclude smaller or newer investors from potential deals. In addition, developers value confidentiality when sourcing financing to prevent competitor knowledge of their pending and closing deals. Developers, therefore, may not widely disseminate information about their properties, limiting the scope of acceptable investors with the proper funding availability to those within the network of a developer. Investors external to this network may not have adequate tools to search for deals that are suitable for them especially because of the confidentiality sought by developers regarding their properties. Accordingly, it can be easier for developers and investors to connect with preexisting relationships.

Capital market brokers can facilitate introductions leading to deals between developers and investors. However, these parties also rely on their network to identify investor interest and may not find an investor to capitalize the deal. These parties may also be time-limited, as they might work with multiple developers and investors so they cannot fully search for potential deals and investors. Depending on their resources, these parties may additionally spend significant time with communication and administrative tasks that take away from time to search for deals or investor interest. Further, capital market brokers can be expensive to leverage, which can be prohibitive for some investors from entering the real estate market.

Once developers and investors are connected, it may be difficult for these parties to understand if they are acceptable partners for a deal. Developers may be interested in debt or equity financing for a property. They also may be interested in a particular looked-for resource. Investors may have requirements on the risk and return they are interested in for a property. These details may be challenging to communicate and may reveal incompatibilities between developers and investors that prevent a deal from closing.

Existing systems and methods for connecting developers and investors can be time-consuming, inefficient, and expensive. Some solutions also fail to address the requirements of both developers and investors, rendering the solutions ineffective. For example, some solutions may not provide adequate privacy features that allow developers to maintain confidentiality and prevent competitors from learning about their properties and financing. Some solutions may not support investors in seeking suitable deals. For example, an investor may be interested in a particular deal size but may not have the tools to find properties seeking investment in that range.

As described herein, novel methods, apparatuses, and computer-readable media provide a real estate networked platform to connect developers and investors. The real estate platform users described herein can define user roles and property features. For example, a user can indicate their role as a general user, or development owner, and property features limiting their sought for investments to a specific looked-for resource and type of investment. Another user can indicate their role as a limited user that can provide debt or equity investments and their typical deal size. The platform can identify which limited users are acceptable to the general user based on matching the property features with the user features. A private interface can be generated with a property post based on the stored property features, which can be accessed by limited users. However, the property post can be visible only to limited users that are acceptable by the general user based on the property features and user features to maintain deal privacy. The limited user can search for suitable deals that are visible to them in the private interface and connect with general users to facilitate deals. Accordingly, the novel methods, apparatuses, and computer-readable media described herein expand the network of developers, while maintaining deal privacy, and allow investors to search for deals that appropriate for their role and investment amount.

The novel methods, apparatuses, and computer-readable media will now be discussed with reference to the figures.

FIG. 1 discloses aspects of exemplary embodiments of a real estate networked platform 100 for searching for a property for investment. As described herein, real estate networked platform 100 can facilitate searching for a property and connect developers and investors. Real estate networked platform 100 can be an application deployed on a user device, e.g., a desktop computer, a laptop computer, a specialized computer server, or an Internet enabled smartphone or tablet. The user device can be any electronic device, or combination of electronic devices, capable of receiving information on a user interface and transmitting data files corresponding to searching for a property.

Real estate networked platform 100 can include one or more interfaces. As shown, real estate networked platform 100 can include a welcome 110 interface, a new account registration 120 interface, and a login 130 interface. Users of real estate networked platform 100 can navigate from welcome 110 to new account registration 120 to characteristic one or more user features, e.g., saved user features 350 (FIG. 28), which will be described further below. If a user has already created an account, the user can navigate from welcome 110 to login 130. Login 130 can retrieve one or more profiles of the user indicating one or more user features of the user.

Real estate networked platform 100 can include a dashboard 140 interface. Dashboard 140 can be based on the one or more user features of the user. From dashboard 140, the user can navigate to a private interface, or marketplace, 150, a my deals 160 interface, a my watchlist 170 interface, or a my profile 180 interface. From each of private interface 150, my deals 160, my watchlist 170, and my profile 180, the user can navigate to dashboard 140 or one of private interface 150, my deals 160, my watchlist 170, or my profile 180. Each of dashboard 140, private interface 150, my deals 160, my watchlist 170, and my profile 180 will be described further below.

Figure 2:
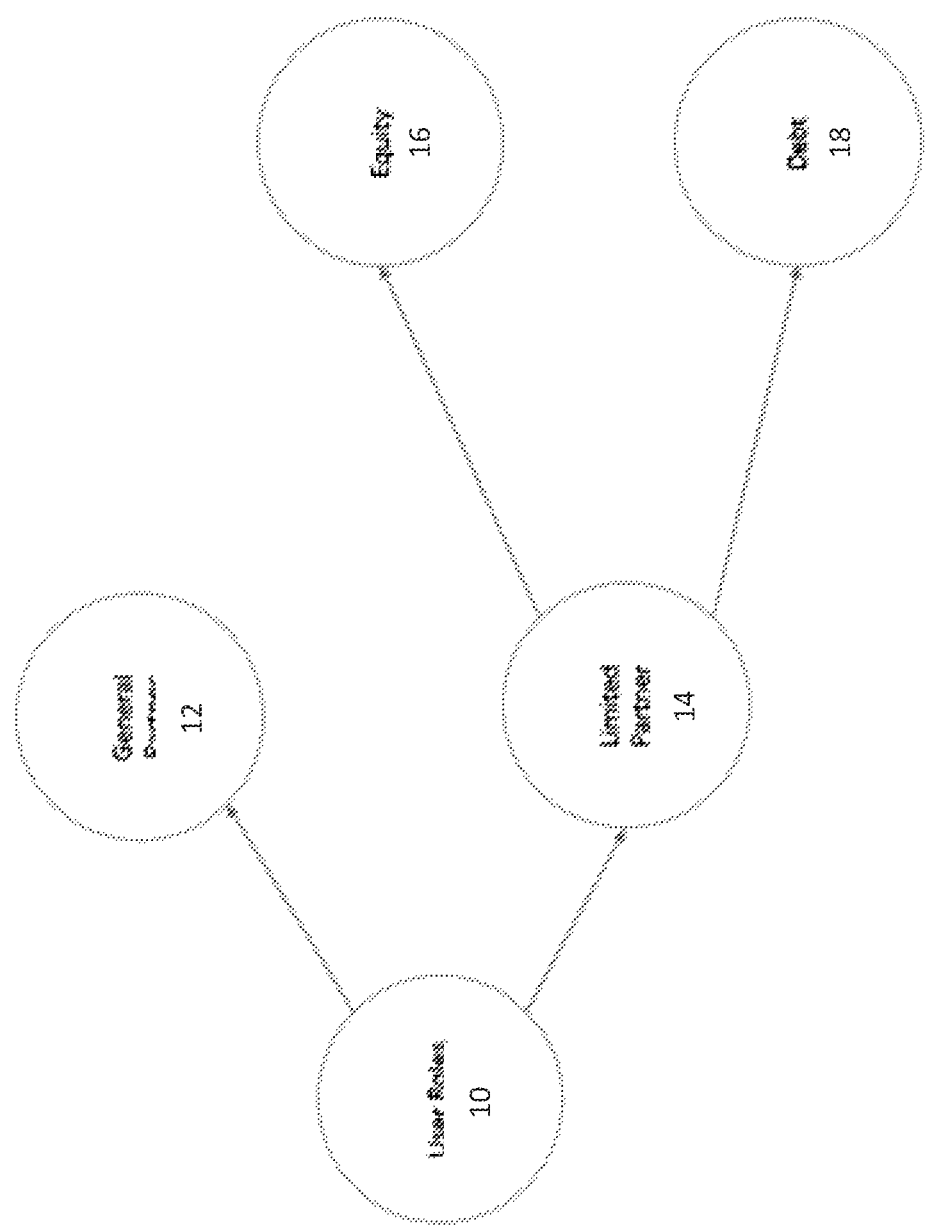
FIG. 2 illustrates example user roles of the real estate networked platform of FIG. 1.

As shown with reference to FIG. 2 according to an exemplary embodiment, a user of real estate networked platform 100 (FIG. 1) can have one or more user roles 10 based on one or more user features, e.g., saved user features 350 (FIG. 28). The user roles 10 can include a general user, or partner, 12 user role and a limited user, or partner, 14 user role. General user 12 can include a developer or an owner of a property. Limited user 14 can be an equity resource, or capital, user 16, where the user possesses an ownership stake in the property, or a debt resource, or capital, user 18, where the user provides a loan for the property. In some cases, the user can be both equity capital user 16 and debt capital user 18.

Based on the requirements of various limited users 14, which can be discerned from user features, e.g., saved user features 350 (FIG. 28), general user 12 can specify which limited user 14 are acceptable, or which limited user 14 they are interested in having as investors. For example, general user 12 can require financing but may not wish to provide equity. Accordingly, general user 12 can specify they are seeking debt capital user 18 only. Alternatively, general user 12 can specify they are seeking equity capital users 16 only. In some cases, general user 12 can specify they are seeking any type of limited user 14. In addition to or alternatively to specifying a type of limited user 14, general user 12 can indicate a looked-for resource that can render a limited user 14 as acceptable. In this way, general user 12 can source a smaller number of large investments to capitalize a deal, in contrast to crowdfunding, which sources a larger number of small investments. To maintain privacy regarding financing, real estate networked platform 100 (FIG. 1) can prevent users that do not meet criteria of general user 12 from viewing respective property features, e.g., saved property features 300 (FIGS. 21-27). Controls for identifying acceptable limited users 14 and related visibility of property features will be described further below.

Figure 3:
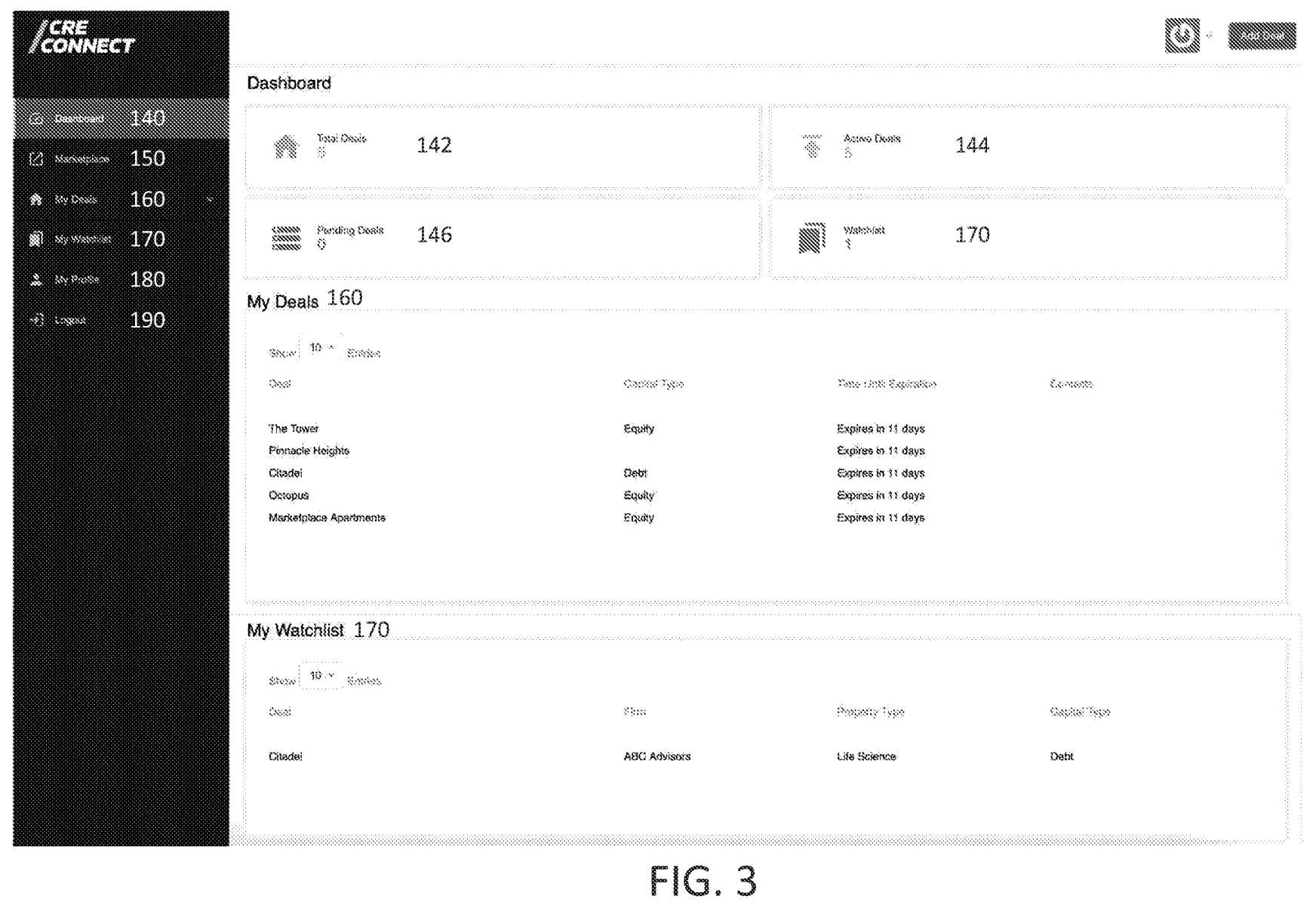

Dashboard 140 according to an exemplary embodiment is shown in FIG. 3. As shown, from dashboard 140, a user can navigate to private interface 150, my deals 160, my watchlist 170, or my profile 180, or can access a logout 190 interface to exit real estate networked platform 100 (FIG. 1).

Dashboard 140 can be customized based one or more user features, e.g., saved user features 350 (FIG. 28). As shown, dashboard 140 can indicate total deals 142 of the user. In other words, the user can be general user 12 (FIG. 2) with one or more deals saved in real estate networked platform 100 (FIG. 1). Saved property features 300 (FIGS. 21-27) for each deal will be described further below. Dashboard 140 can also indicate a number of active deals 144. Active deals 144 can be visible to acceptable limited users 14 (FIG. 2) in private interface 150 as property posts, e.g., property posts 200 (FIG. 4).

Figure 4:
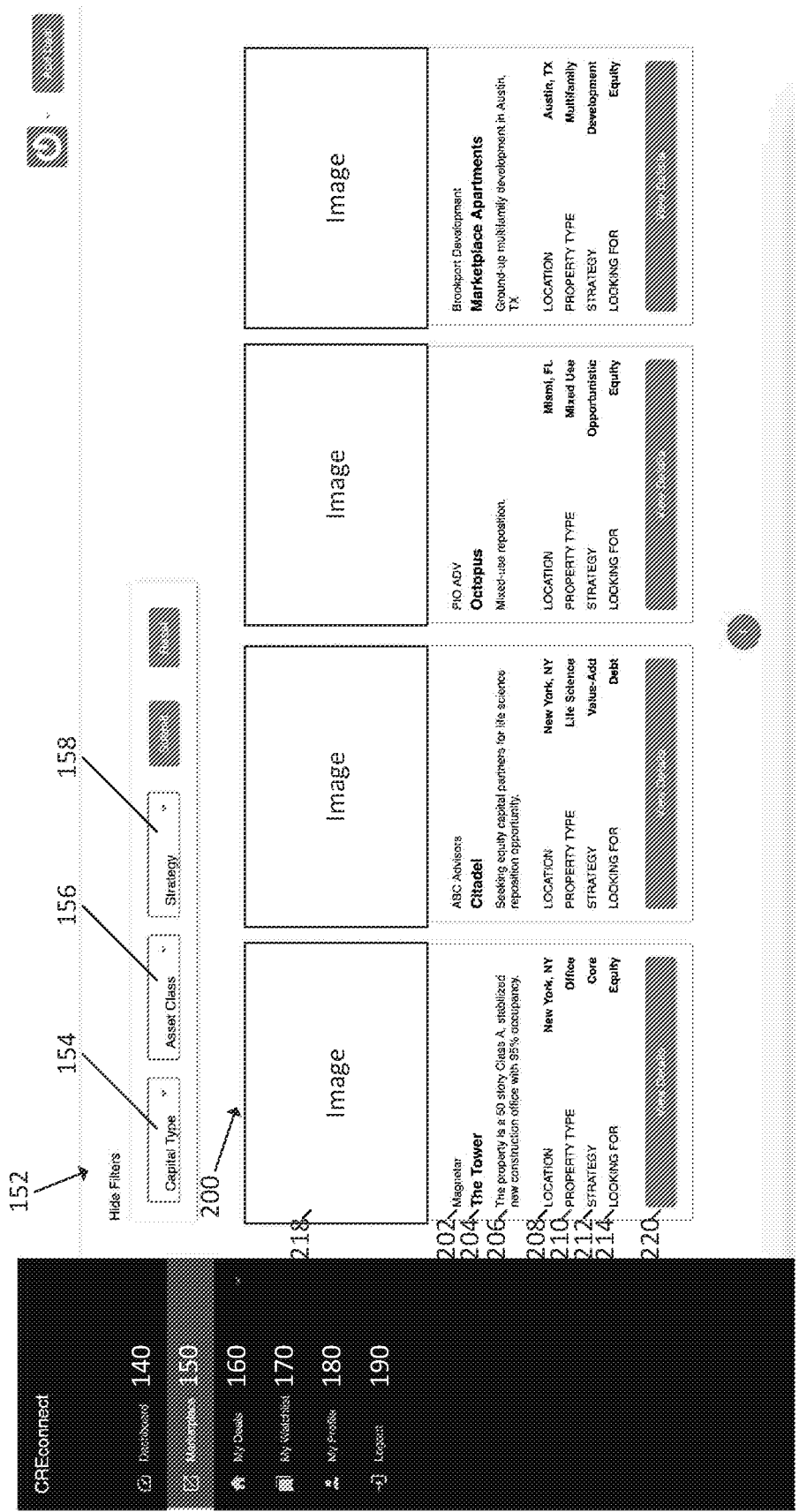
FIG. 4 illustrates a private interface of the real estate networked platform of FIG. 1.

With reference to FIGS. 3-4 according to an exemplary embodiment, deals can be active such that they are published as property posts 200 via private interface 150 once one or more saved property features 300 (FIGS. 21-27) are received. Instead of being active such that a property post 200 is visible to acceptable limited users 14 (FIG. 2) via private interface 150, property post 200 can be paused such that property post 200 is not visible to acceptable limited users 14 in private interface 150. Property posts 200 can be actively paused by general user 12 (FIG. 2). For example, if general user 12 is negotiating closing a deal with limited user 14, they may wish to pause a property post 200 to prevent further exposure of the deal via private interface 150. In another example, general user 12 may wish to pause a property post 200 if they are no longer seeking financing or are unsure of financing needs.

Property posts 200 can additionally or alternatively be passively paused. After a threshold time period, for example, a property post 200 can be paused. The threshold time period can be two weeks, thirty days, two months, six months, or one year, for example. Additionally or alternatively, real estate networked platform 100 (FIG. 1) can require a monetary payment to have a property post 200 published. General user 12 (FIG. 2) can be required to periodically provide monetary payment to maintain publication of the deal, e.g., every two weeks, every month, every two months, every six months, or every year, for example. Accordingly, if a periodic monetary payment is not received, a property post 200 can be automatically paused.

Referring to FIG. 3, dashboard 140 can show total deals 142. Total deals 142 can refer to the deals of the user that are stored on real estate networked platform 100 (FIG. 1). Dashboard 140 can also show a number of pending deals 146. Pending deals 146 can indicate deals that are not yet active, or published. The user may be in the process of building a property post 200 (FIG. 4), or they may have submitted property post 200 and are awaiting review via a backend system 2900 (FIG. 29) such that property post 200 can be published. In addition, dashboard 140 can show the number of deals comprising my deals 160 and a watchlist 170. My deals 160 can show deals of a user that are active, paused, and pending. If active, an expiration date for the related property post 200 can be shown. In addition, a resource, or capital, type and a number of contacts made via a contact form 240 (FIGS. 9-11) can be shown. Watchlist 170 can be a collection of deals that the user is able to view via private interface 150 and is interested in monitoring. One or more details about related property posts 200 can be shown, e.g., firm name, property type, and capital type. My deals 160 and watchlist 170 will be described further below.

Private interface 150 according to an exemplary embodiment is shown in FIG. 4. As shown, from private interface 150, a user can navigate to dashboard 140, my deals 160, my watchlist 170, my profile 180, or logout 190.

Private interface 150 can be customized based one or more user features, e.g., saved user features 350 (FIG. 28). As shown, private interface 150 can show one or more property posts 200. Property posts 200 being visible in private interface 150 indicate the user is an acceptable limited user 14 (FIG. 2) for the deals described in property posts 200. In addition, property posts 200 being visible in private interface 150 indicate property posts 200 are configured to be published rather than paused. Each property post 200 can include one or more property features based on one or more saved property features 300 (FIGS. 21-27). As shown each property post 200 can include property features such as a general user 202, a property 204, a description 206, a location 208, a property type 210, an investment strategy 212, a looked-for user type, or capital user, 214, and an image 218, among other details.

As shown, private interface 150 can include one or more filters 152. Filters 152 can sort property posts 200 in private interface 150. Accordingly, the user accessing private interface 150, e.g., limited user 14 (FIG. 2), can search private interface 150 for deals by selecting one or more filters 152.

Figure 5:
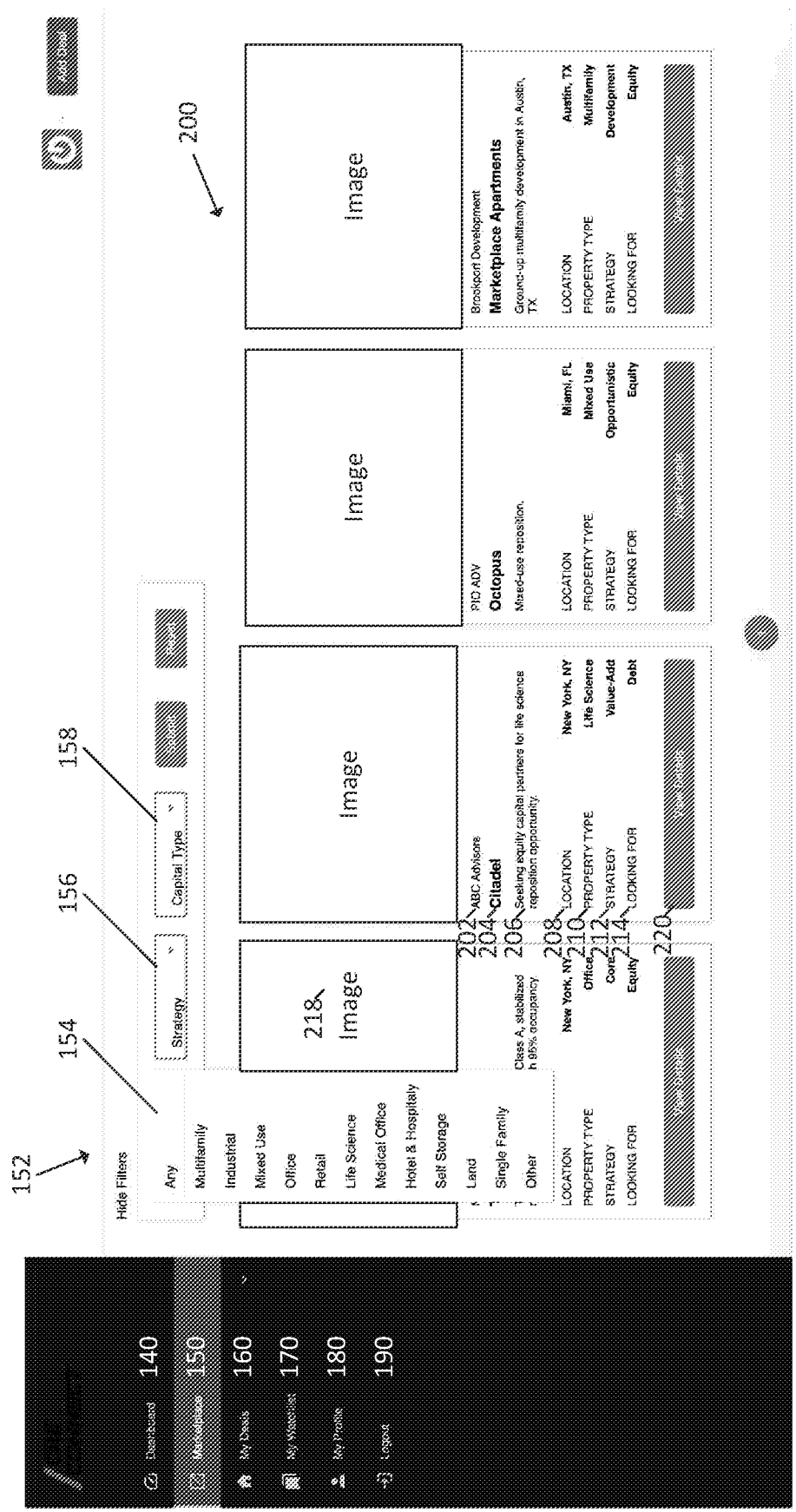
FIG. 5 illustrates the private interface of FIG. 4.

Filters 152 can include a property type filter 154. Property type filter 154 can refer to property type 210. As shown in FIG. 5 according to an exemplary embodiment, property type filter 154 can sort property posts 200 in private interface 150 as multifamily, industrial, mixed use, office, retail, life science, medical office, hotel and hospitality, self storage, land, single family, and other, among other property types 210.

Figure 6:
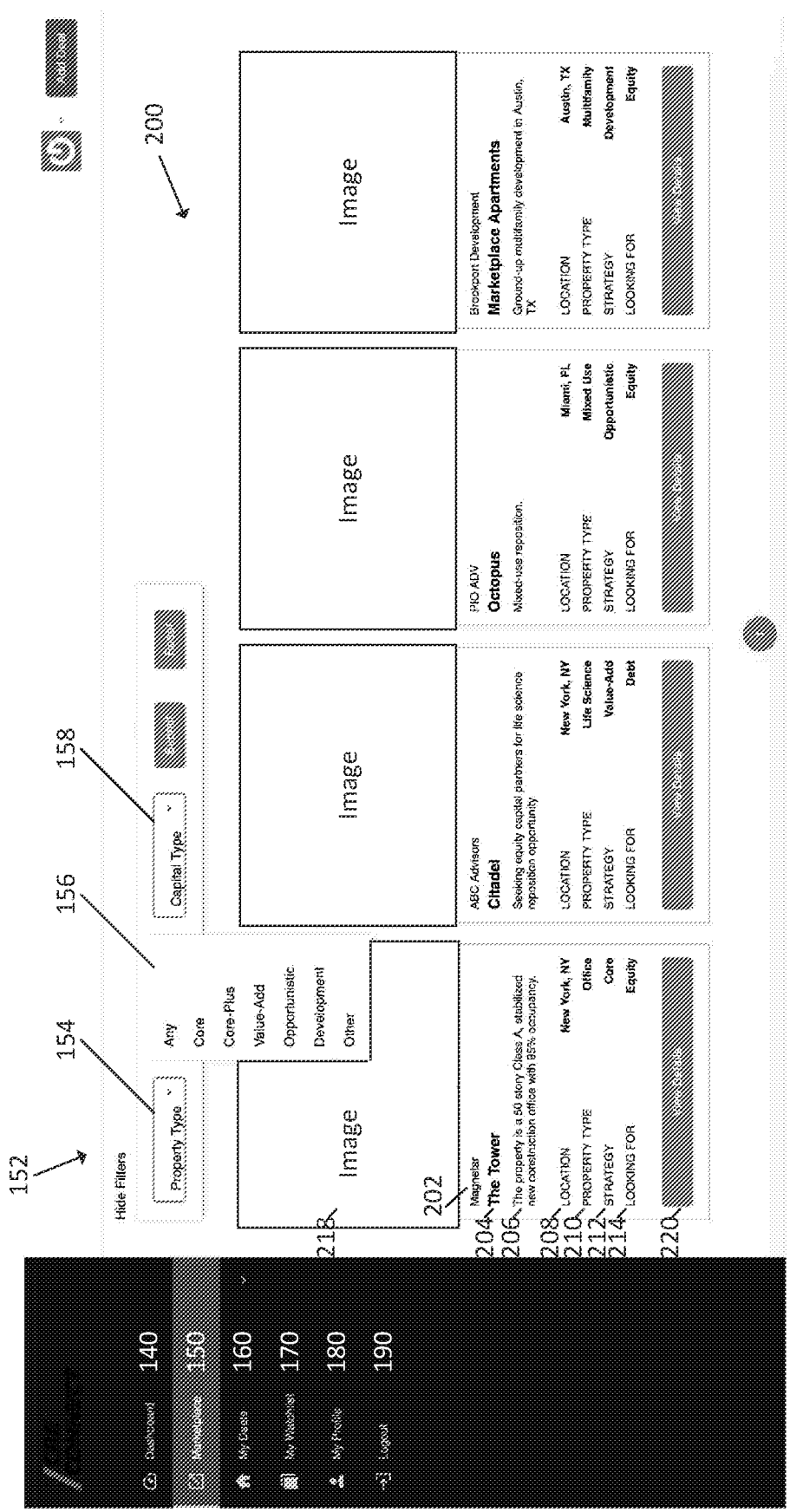
FIG. 6 illustrates the private interface of FIG. 4.

Filters 152 can include an asset class filter 156. Asset class filter 156 can refer to investment strategy 212. As shown in FIG. 6 according to an exemplary embodiment, asset class filter 156 can sort property posts 200 in private interface 150 as core, core-plus, value-add, opportunistic, development, and other, among other investment strategies 212.

Figure 7:
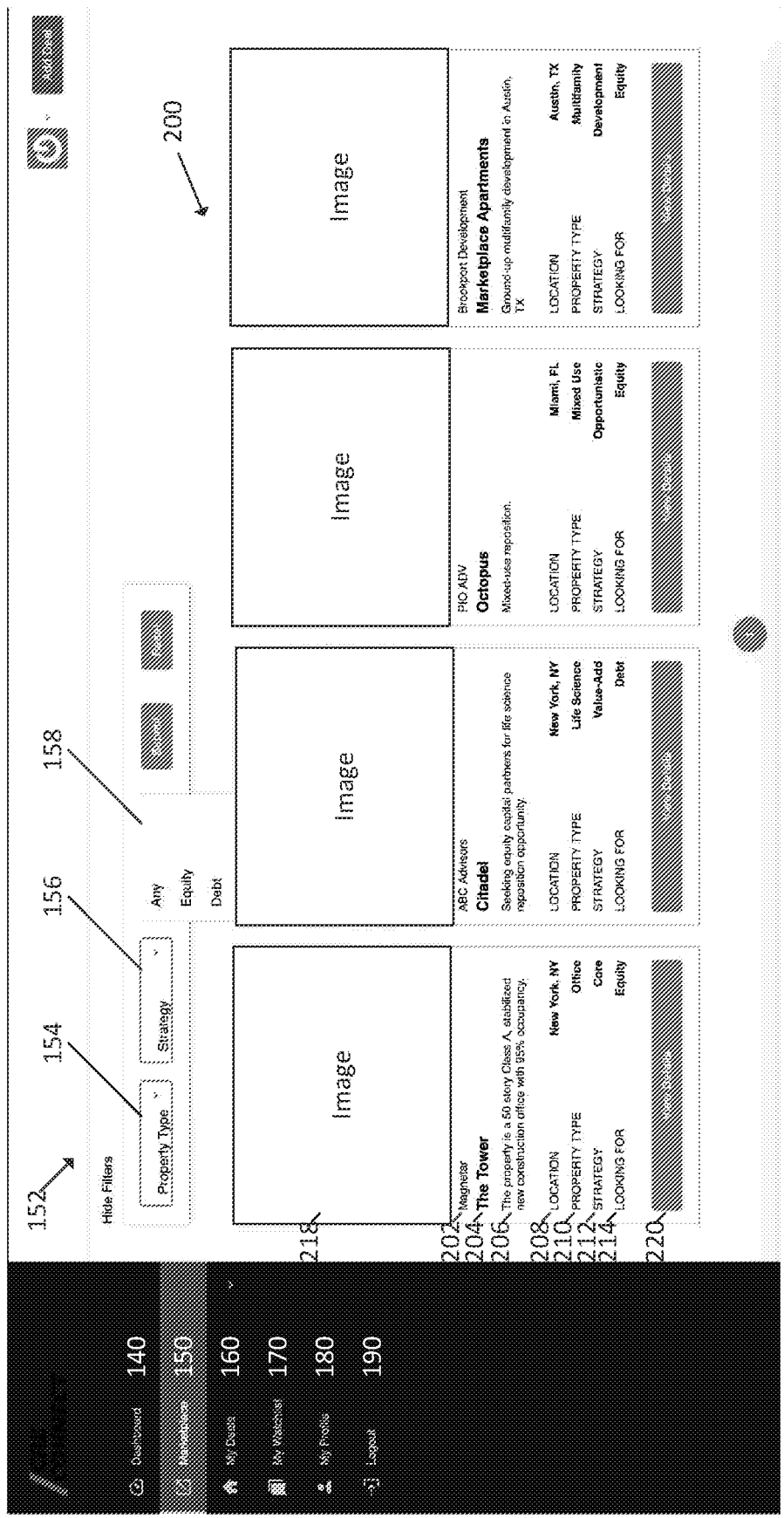
FIG. 7 illustrates the private interface of FIG. 4.

Filters 152 can include a resource, or capital, type filter 158. Resource type filter 158 can refer to looked-for user type 214. As shown in FIG. 7 according to an exemplary embodiment, resource type filter 158 can sort property posts 200 in private interface 150 as equity and debt, and other, among other looked-for user types 214.

Figure 8:
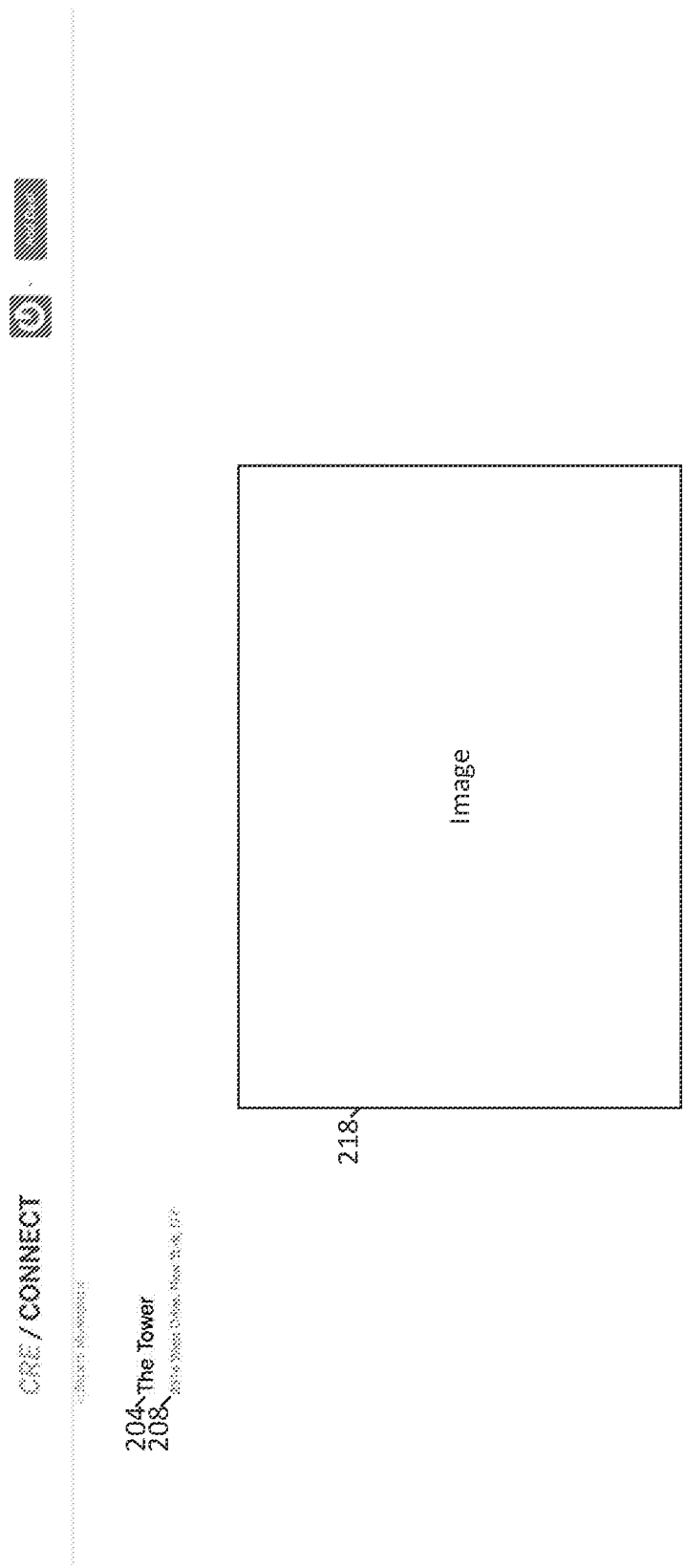
FIG. 8 illustrates a property post of the real estate networked platform of FIG. 1.

FIGS. 4-7 also show a view details button 220 for each property post 200. Property post 200 can include view details button 220, which can navigate to one or more interfaces with one or more property features based on one or more saved property features 300 (FIGS. 21-27), e.g., general user 202, property 204, description 206, location 208, property type 210, investment strategy 212, looked-for user type 214, and image 218, among other details. FIG. 8 shows an interface accessible via view property features 220 (FIGS. 4-7) according to an exemplary embodiment. As shown, property 204, location 208, and image 218 can be displayed.

Figure 10:
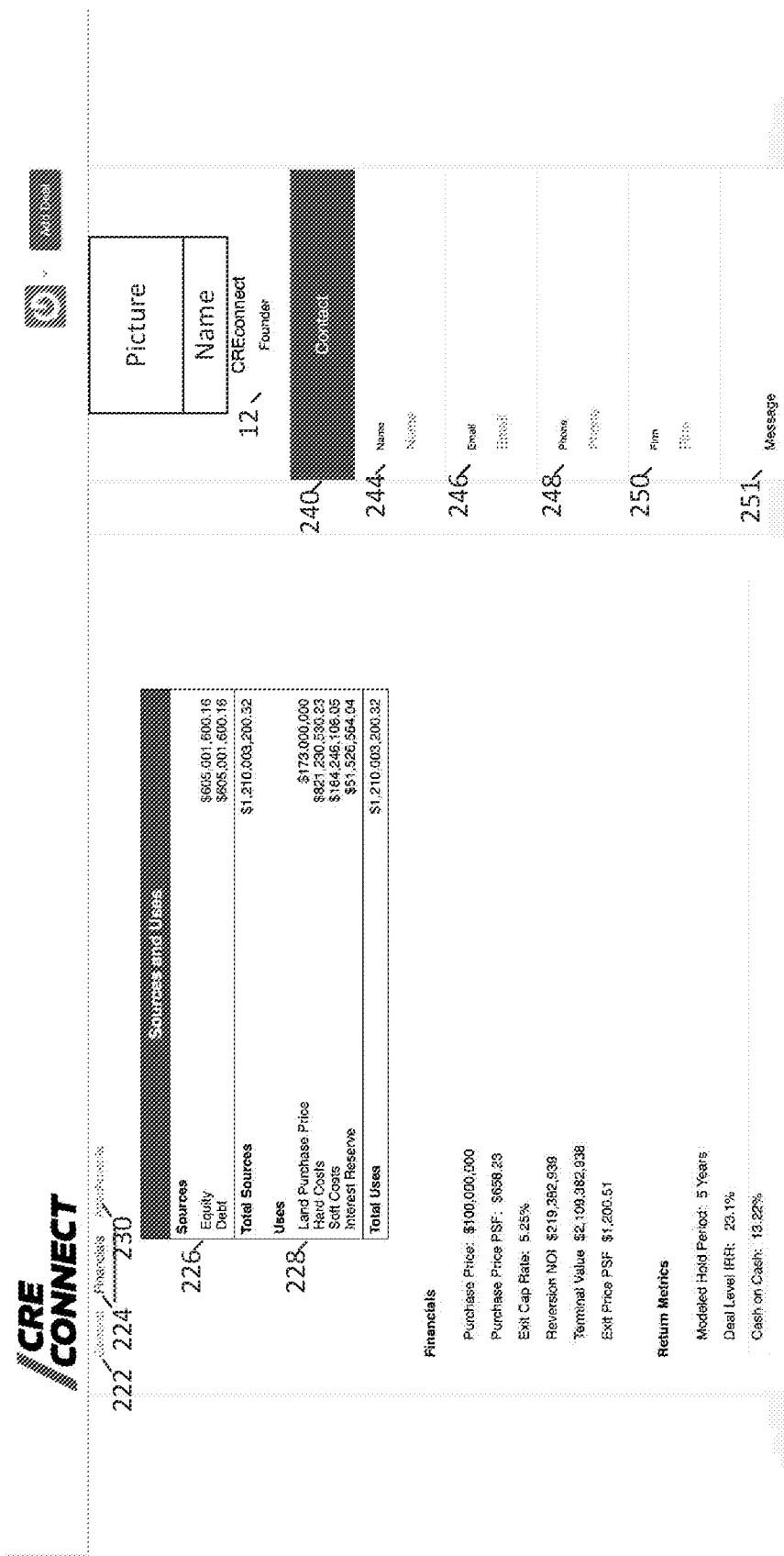
FIG. 10 illustrates the property post of FIG. 8.
Figure 11:
FIG. 11 illustrates the property post of FIG. 8.

FIGS. 9-11 show interfaces accessible via view property features 220 (FIGS. 4-7) according to an exemplary embodiment. As shown in FIG. 9, a general tab 222 can include one or more property features based on one or more saved property features 300 (FIGS. 21-27). General tab 222 can show, for example, a WALT (Weighted Average Lease Term) 203, description 206, a zoning 207, a current FAR (floor area ratio) 209, property type 210, buildable FAR 211, investment strategy 212, a rentable square footage 213, looked-for user type 214, a looked-for resource amount, or resource characteristic 216, a looked-for limited user entity 215, a number of buildings 217, a units 221 characteristic, and a parking 219 characteristic, among other details. As shown in FIG. 10, a financials tab 224 can include, for example, sources 226 of financing for property 204 (FIG. 9) and uses 228 of financing. Financials tab 224 can describe financials related to property 204, e.g., purchase price, purchase price PSF (price per square foot), exit cap rate, reversion NOI (net operating income), terminal value, and exit price PSF), among other details. Financials tab 224 can also describe return metrics, e.g., modeled hold period, deal level IRR (internal rate of return), and cash on cash, among other details. As shown in FIG. 11, an attachments tab 230 can include, for example, one or more deal files 232. Deal files 232 can include financial data, for example, for property 204.

With reference to FIGS. 9-11, users, e.g., acceptable limited users 14 (FIG. 2), can contact other users, e.g., general user 12 (FIG. 2) via general tab 222, financials tab 224, and attachments 230. As shown, each of general tab 222, financials tab 224, and attachment 330 can include contact form 240. Contact form 240 can include a name characteristic 244, an email characteristic 246, a phone characteristic 248, a firm characteristic 250, and a message characteristic 251, among other details. Limited user 14 can characteristic their information in one or more of name characteristic 244, email characteristic 246, phone characteristic 248, firm characteristic 250, and message characteristic 251 and submit contact form 240. Limited user 14 can contact general user 12 via contact form 240 to indicate interest in financing a deal, for example. In this way, contact form 240 can facilitate connection between general user 12 and limited user 14 such that property post 200 (FIGS. 4-7) serves as a medium of conversation between unfamiliar parties.

Real estate networked platform 100 (FIG. 1) can store information regarding contact form 240 submissions. After a threshold time period, real estate networked platform 100 can generate one or more automatic follow up inquiries to one or more of general user 12 and limited user 14 to verify an outcome of contact form 240 being submitted, e.g., if a deal was closed. The threshold time period can be two weeks, thirty days, two months, six months, or one year, for example.

Figure 12:
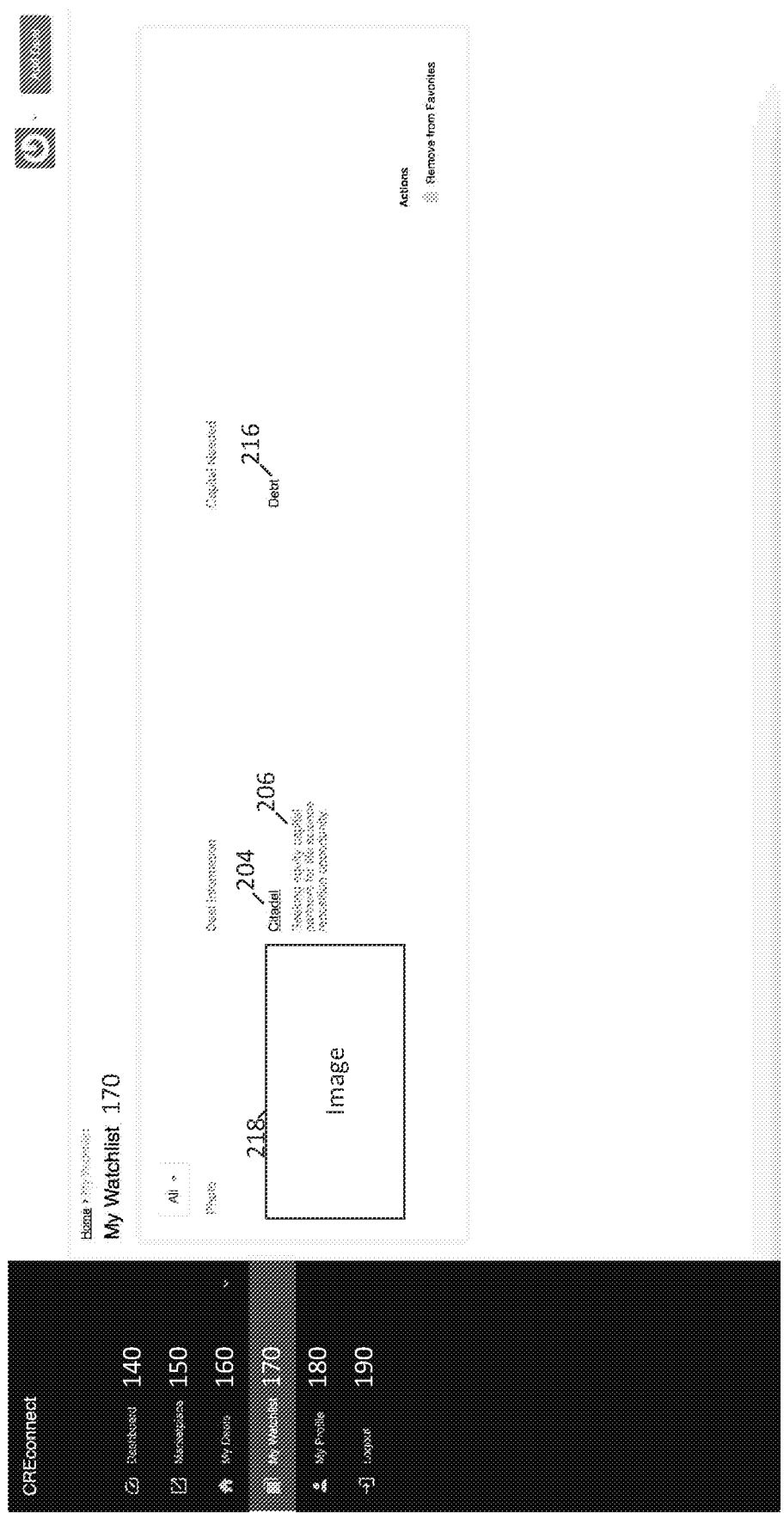
FIG. 12 illustrates a watchlist of the real estate networked platform of FIG. 1.

If a user, e.g., limited user 14 (FIG. 2), is considering one or more deals, they can save one or more property posts 200 (FIG. 4) in my watchlist 170. As shown in FIG. 12 according to an exemplary embodiment, my watchlist 170 can show one or more properties 204 from property posts 200. In this way, the user can monitor deals before contacting general user 12 of property 204 to indicate interest in financing a deal. As discussed above, property posts 200 can be published or paused. Properties 204 that are visible in my watchlist 170 can be related to published property posts 200. If a property post 200 is paused, the related property 204 can be removed from my watchlist 170.

General user 12 (FIG. 2) can view impression data, or viewer analytic data, related to their property posts 200 (FIG. 4) featuring their properties 204 saved in my watchlist 170. For example, general user 12 can be apprised of how many users, e.g., limited users 14 (FIG. 2), have a particular property post 200 saved in my watchlist 170. General user 12 can additionally or alternatively view impression data related to property posts 200 in private interface 150 (FIG. 4). Users can view property posts 200 and interact with property posts 200 in a variety of ways. They can navigate a cursor on a desktop computer or a laptop computer to a particular property post 200, indicating their attention on the particular property post 200. The duration of the interaction can be impression data that is available to general user 12. On a smartphone or tablet, users can view one property post 200 at a time. The duration of the property post 200 being viewed can similarly be impression data that is available to general user 12. Other impression data available to general user 12 can include statistics on which filters 152 (FIGS. 4-7) are selected, a number of times view property features 220 (FIGS. 4-7) has been selected for a particular property post 200, and duration impression data on general tab 222 (FIGS. 9-11), financials tab 224 (FIGS. 9-11), and attachments 230 (FIGS. 9-11) after view property features 220 is selected.

With respect to any of the described impression data, general user 12 (FIG. 2) can also view related demographic data. For example, information on what user role 10 (FIG. 2) is generating particular impression data can be available to general user 12. Other user features, e.g., based on saved user features 350 (FIG. 28), of the user generating particular impression data can also be available.

Access to impression data and/or related demographic data can be based on a monetary payment. General user 12 (FIG. 2) can be required to provide monetary payment to view some or all impression data and/or related demographic data. Payment can be per property post 200 (FIG. 4), for example, to provide access to some or all impression data and/or related demographic data. Alternatively, a periodical payment per property post 200 can be required to access some or all impression data and/or related demographic data. Access to some or all impression data and/or related demographic data can be paused if a periodic monetary payment is not received. In this way, general user 12 can access impression data and/or related demographic data via tiered user accounts associated with different monetary attributions.

Similarly, limited user 14 (FIG. 14) can access impression data and/or related demographic data. Limited user 14 can be interested in which other limited users 14, if any, are interacting with a property post 200 (FIG. 4). In private interface 150 (FIG. 4), for example, or another interface of real estate networked platform 100 (FIG. 1), limited user 14 can view click or hover impression data and/or related demographic data. Such access can be provided via tiered user accounts associated with different monetary attributions. The tiered accounts can be monetarily based as described above with respect to general user 12 (FIG. 2).

Alternative to limited user 14 (FIG. 2) providing monetary payment to have impression data and/or related demographic data available to limited user 14, general user 12 (FIG. 2) can facilitate such access to, for example drive interest in a particular property post 200 (FIG. 4) as impression data and/or related demographic data can generate a sense of urgency to close a deal among interested limited users 14. General user 12 can also obtain a verification token, such as a badge, that can be displayed in private interface 150 (FIG. 4), for example, or another interface of real estate networked platform 100 (FIG. 1). The verification token can be based on data regarding contact form 240. For example, general user 12 can verify that a deal closed via contact form 240, and real estate networked platform 100.

The verification token can indicate that general user 12 is a successful user of real estate networked platform 100. Accordingly, limited user 12 can view the verification token to be apprised of an investment history of general user 12. Another verification token can indicate authentication of a user, e.g., general user 12 or limited user 14, such as by verifying their user features, or saved user features 350 (FIG. 28). Accordingly, users can view the verification token and be apprised of an identity authentication of the respective general user 12 or limited user 14. To maintain privacy, investment history and identity authentication that may build various verification tokens can be based on voluntary information provided by the respective user. This data can be stored in backend system Verification tokens can be made visible to users via tiered user accounts associated with different monetary attributions. The tiered accounts can be monetarily based as described above.

The exemplary embodiments described herein will now be described with reference to methods for searching for a property.

Figure 13:
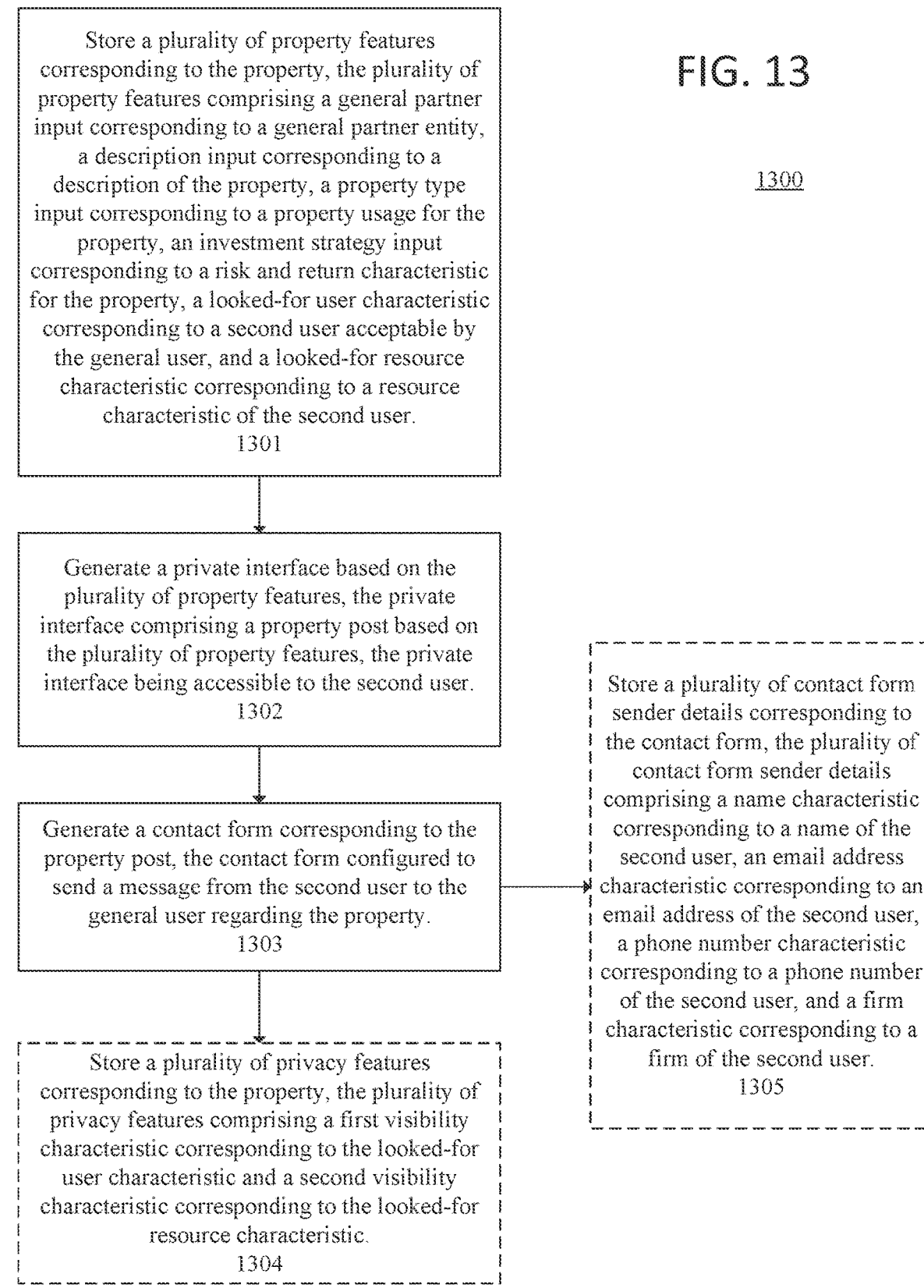
FIG. 13 illustrates a flowchart of a method of searching for a property according to exemplary embodiment.

FIG. 13 illustrates a flowchart of a method 1300 for searching for a property according to an exemplary embodiment. Method 1300 can include one or more of the exemplary embodiments described herein.

At step 1301, method 1300 can store a plurality of property features corresponding to the property. The plurality of property features can include a general user characteristic corresponding to a general user, a description characteristic corresponding to a description of the property, a property type characteristic corresponding to a property usage for the property, an investment strategy characteristic corresponding to a risk and return characteristic for the property, a looked-for user characteristic corresponding to a second user acceptable by the general user, and a looked-for resource characteristic corresponding to a resource characteristic of the second user. The plurality of property features can also include a financial characteristic corresponding to financial information regarding the property, the financial information comprising sources of financing and uses of financing. The second user can be an equity resource user, the second user can be a debt resource user, or the second user can be an equity resource user and a debt resource user. The plurality of property features can also include a gallery characteristic corresponding to one or more images of the property. The plurality of property features can include the one or more property features in property post 200 (FIG. 4), such as a general user 202, a property 204, a description 206, a location 208, a property type 210, an investment strategy 212, a looked-for user type 214, and an image 218, among other details. The plurality of property features can include the one or more saved property features 300 (FIGS. 21-27).

At step 1302, method 1300 can generate a private interface based on the plurality of property features, the private interface comprising a property post based on the plurality of property features, the private interface being accessible to the second user. The private interface can be private interface 150 (FIG. 4), for example, comprising property posts 200 (FIG. 4).

At step 1303, method 1300 can generate a contact form corresponding to the property post, the contact form configured to send a message from the second user to the general user regarding the property. The contact form can be contact form 240 (FIGS. 9-11), for example. Step 1303 can include step 1305. At step 1305, method 1300 can store a plurality of contact form sender details corresponding to the contact form, the plurality of contact form sender details comprising a name characteristic corresponding to a name of the second user, an email address characteristic corresponding to an email address of the second user, a phone number characteristic corresponding to a phone number of the second user, and a firm characteristic corresponding to a firm of the second user.

Figure 27:
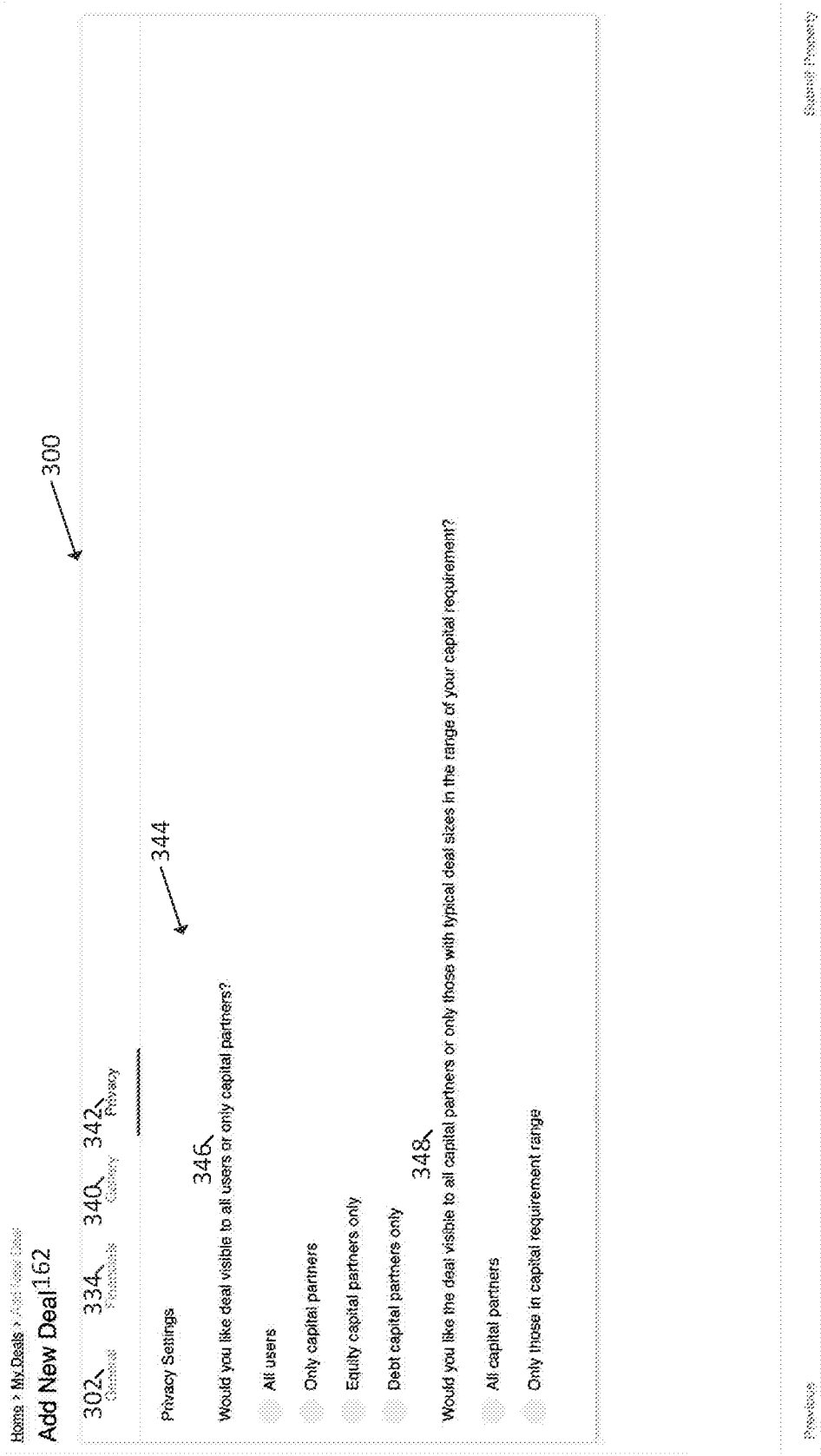
FIG. 27 illustrates the add deal interface of FIG. 21.

At step 1304, method 1300 can store a plurality of privacy features corresponding to the property, the plurality of privacy features comprising a first visibility characteristic corresponding to the looked-for user characteristic and a second visibility characteristic corresponding to the looked-for resource characteristic. The second user can be at least one of an equity resource user or a debt resource user. The plurality of privacy features can be saved privacy features 344 (FIG. 27) including first visibility characteristic 346 (FIG. 27) and second visibility characteristic 348 (FIG. 27). The first visibility characteristic corresponding to the looked-for user characteristic can correspond to property features from property post 200, such as looked-for user type 214 (FIG. 9) and looked-for limited user entity 215 (FIG. 9). The second visibility characteristic corresponding to the looked-for resource characteristic can correspond to property features from property post 200, such as looked-for resource amount 216 (FIG. 9).

According to step 1304, the second user can comply with the plurality of privacy features such that the property post is visible to the second user in the private interface. The private interface can also be accessible to a third user. The third user may not comply with at least one of the plurality of privacy features such that the property post is not visible to the third user in the private interface. The private interface can also be accessible to a fourth user. The fourth user can comply with the plurality of privacy features such that the property post is visible to the fourth user in the private interface. The plurality of privacy features can facilitate property post 200 (FIG. 4) being visible in private interface 150 (FIG. 4), indicating a user complies with the plurality of privacy features, or is an acceptable limited user 14 (FIG. 2), for the deal described in property post 200, e.g., by complying with one or more of looked-for user type 214 (FIG. 9), looked-for limited user entity 215 (FIG. 9), or looked-for resource amount 216 (FIG. 9). Property post 200 not being visible in private interface 150 can indicate a user does not comply with the plurality of privacy features, or is not an acceptable limited user 14, for the deal described in property post 200, e.g., by not complying with one or more of looked-for user type 214 (FIG. 9), looked-for limited user entity 215 (FIG. 9), or looked-for resource amount 216 (FIG. 9).

Figure 14:
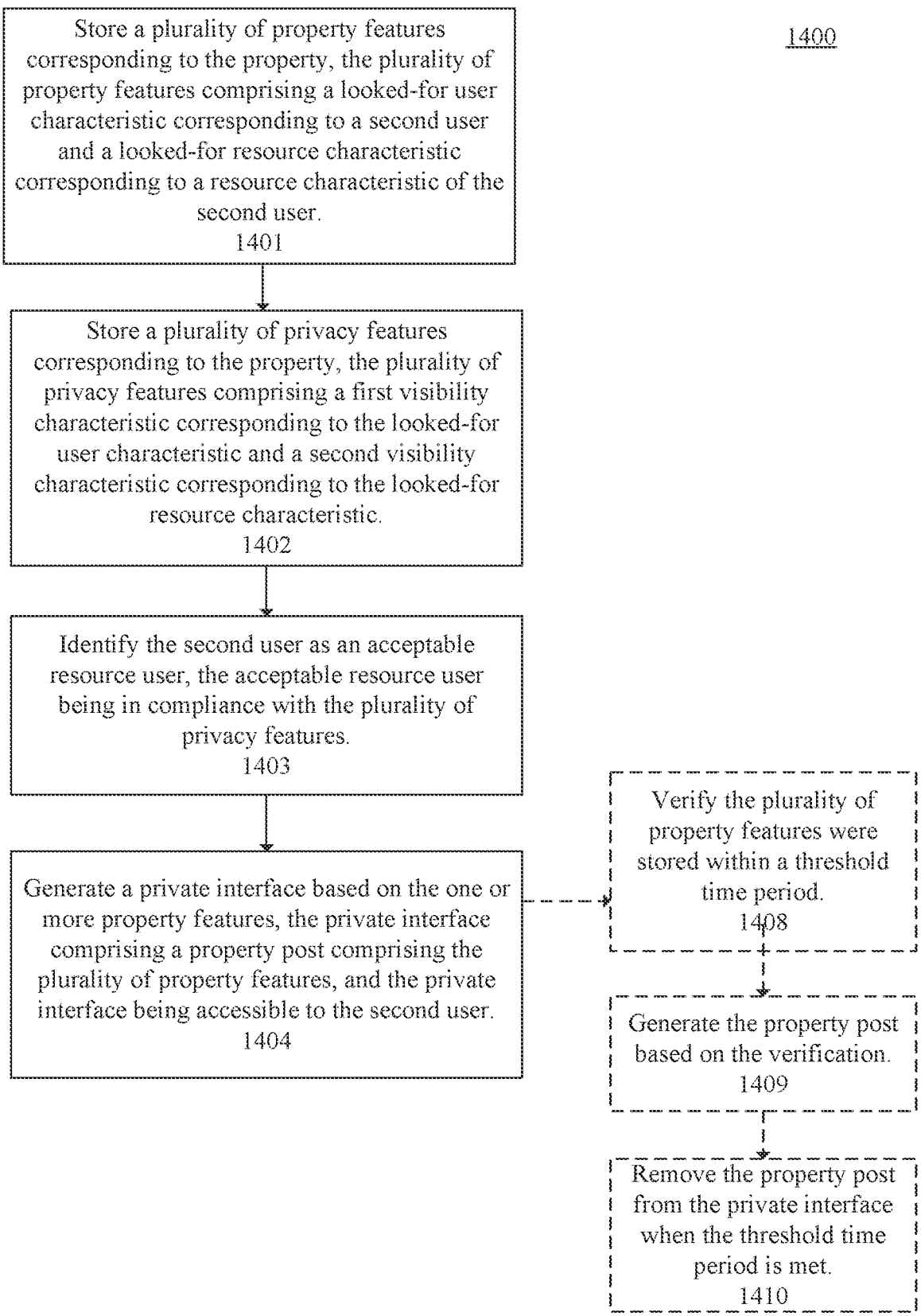
FIG. 14 illustrates a flowchart of a method of searching for a property according to exemplary embodiment.
Figure 17:
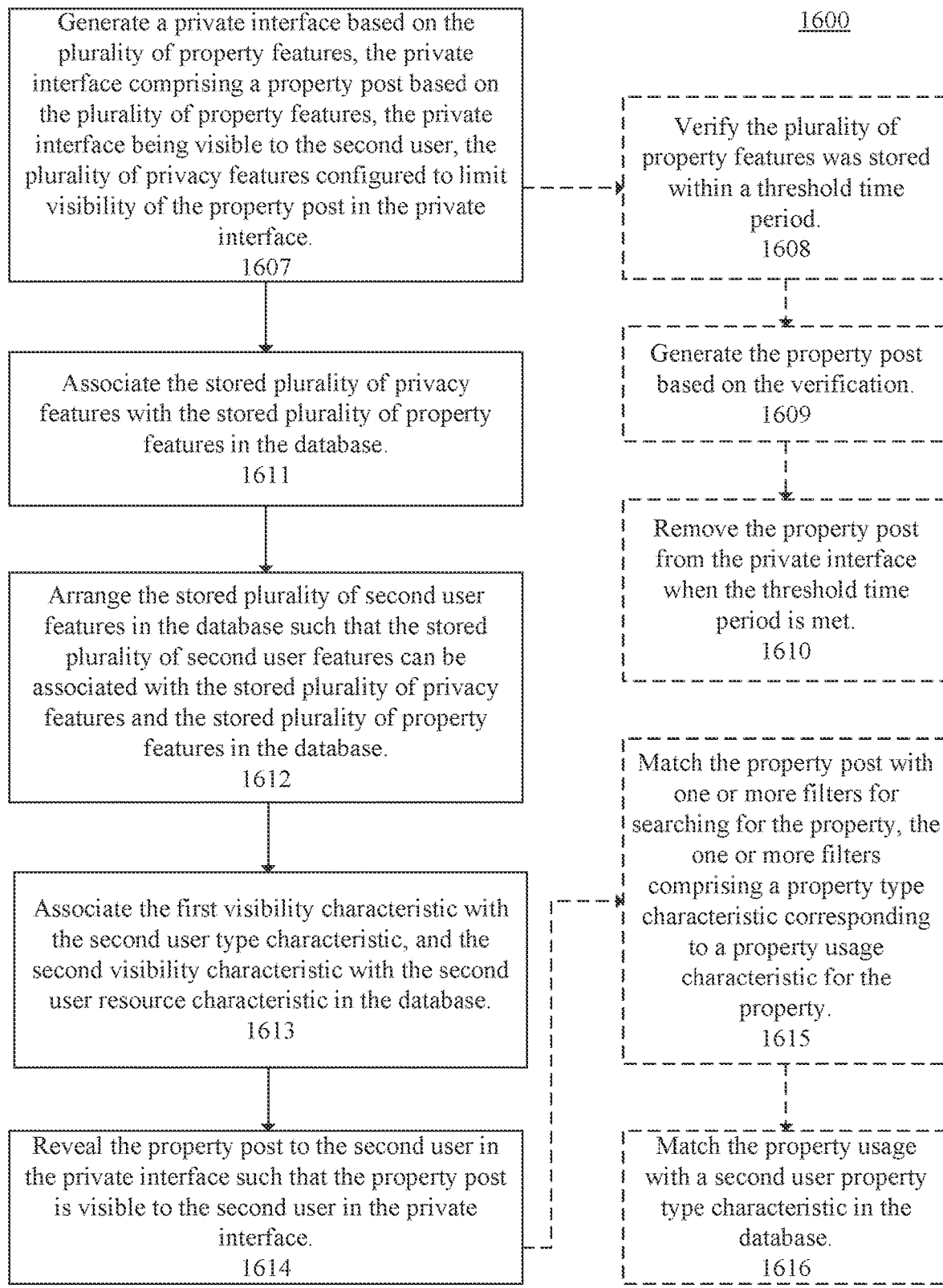
FIG. 17 illustrates a flowchart of the method of FIG. 16.

FIGS. 14-15 illustrate a flowchart of a method 1400 for searching for a property according to an exemplary embodiment. Method 1400 can include one or more of the exemplary embodiments described herein.

At step 1401, method 1400 can store a plurality of property features corresponding to the property, the plurality of property features comprising a looked-for user characteristic corresponding to a second user and a looked-for resource characteristic corresponding to a resource characteristic of the second user. The second user can be an equity resource user, the second user can be a debt resource user, or the second user can be an equity resource user and a debt resource user.

At step 1402, method 1400 can store a plurality of privacy features corresponding to the property, the plurality of privacy features comprising a first visibility characteristic corresponding to the looked-for user characteristic and a second visibility characteristic corresponding to the looked-for resource characteristic. The plurality of privacy features can be saved privacy features 344 (FIG. 27) including first visibility characteristic 346 (FIG. 27) and second visibility characteristic 348 (FIG. 27). The first visibility characteristic corresponding to the looked-for user characteristic can correspond to property features from property post 200, such as looked-for user type 214 (FIG. 9) and looked-for limited user entity 215 (FIG. 9). The second visibility characteristic corresponding to the looked-for resource characteristic can correspond to property features from property post 200, such as looked-for resource amount 216 (FIG. 9). According to method 1400, the looked-for user characteristic can be an equity resource user such that the second user is an equity resource user.

At step 1403, method 1400 can identify the second user as an acceptable resource user, the acceptable resource user being in compliance with the plurality of privacy features, e.g., by complying with one or more of looked-for user type 214 (FIG. 9), looked-for limited user entity 215 (FIG. 9), or looked-for resource amount 216 (FIG. 9).

At step 1404, method 1400 can generate a private interface based on the one or more property features, the private interface comprising a property post comprising the plurality of property features, and the private interface being accessible to the second user. The private interface can be private interface 150 (FIG. 4), for example, comprising property posts 200 (FIG. 4).

Step 1404 can include steps 1408-1410. At step 1408, method 1400 can verify the plurality of property features were stored within a threshold time period. At step 1409, method 1400 can generate the property post based on the verification. At step 1410, method 1400 can remove the property post from the private interface when the threshold time period is met. As discussed above, deals can be published as property posts 200 (FIG. 4) or paused. Property posts 200 can be published once the plurality of property features are stored. Instead of being published such that a property post 200 is visible to acceptable limited users 14 (FIG. 2) via private interface 150, property post 200 can be paused such that property post is not visible in private interface 150. Property posts 200 can be passively paused. After a threshold time period, for example, a property post 200 can be paused. The threshold time period can be two weeks, thirty days, two months, six months, or one year, for example.

At step 1405, method 1400 can reveal the property post to the second user in the private interface such that the property post is visible to the second user in the private interface based on compliance by the second user with the plurality of privacy features. The plurality of privacy features can facilitate property post 200 (FIG. 4) being visible in private interface 150 (FIG. 4), indicating a user complies with the plurality of privacy features, or is an acceptable limited user 14 (FIG. 2), for the deal described in property post 200. Property post 200 not being visible in private interface 150 can indicate a user does not comply with the plurality of privacy features, or is not an acceptable limited user 14, for the deal described in property post 200, e.g., by not complying with one or more of looked-for user type 214 (FIG. 9), looked-for limited user entity 215 (FIG. 9), or looked-for resource amount 216 (FIG. 9).

Step 1405 can include step 1411. At step 1411, method 1400 can match the property post with one or more filters for searching for the property, the one or more filters comprising at least one of a property type characteristic corresponding to a property usage for the property, an investment strategy characteristic corresponding to a risk and return characteristic for the property. As discussed above, private interface 150 (FIG. 4) can include one or more filters 152 (FIG. 4). Filters 152 can sort property posts 200 (FIG. 4) in private interface 150. Accordingly, the user accessing private interface 150, e.g., limited user 14 (FIG. 2), can search private interface 150 for deals by selecting one or more filters 152. As shown with reference to FIG. 4, for example, filters 152 can include at least one of property type filter 154, asset class filter 156, and capital type, or strategy, filter 158.

At step 1406, method 1400 can store one or more user features corresponding to the second user, the one or more user features comprising a capital characteristic comprising a resource value. The looked-for resource characteristic can be a range comprising the resource value. The user features can be saved user features 350 (FIG. 28), for example. Limited user 14 (FIG. 2), for example, can specify a typical deal size in which they engage, e.g., a range, or capital characteristic, comprising a resource value, e.g., $10 million or $50 million, which can be matched with a looked-for resource amount 216 (FIG. 9) of general user 12 (FIG. 2).

At step 1407, method 1400 can generate a contact form corresponding to the property post, the contact form configured to send a message from the second user to the general user regarding the property. The contact form can be contact form 240 (FIGS. 9-11), for example. At step 1407, method 1300 can store a plurality of contact form sender details corresponding to the contact form, the plurality of contact form sender details comprising a name characteristic corresponding to a name of the second user, an email address characteristic corresponding to an email address of the second user, a phone number characteristic corresponding to a phone number of the second user, and a firm characteristic corresponding to a firm of the second user.

Figure 20:
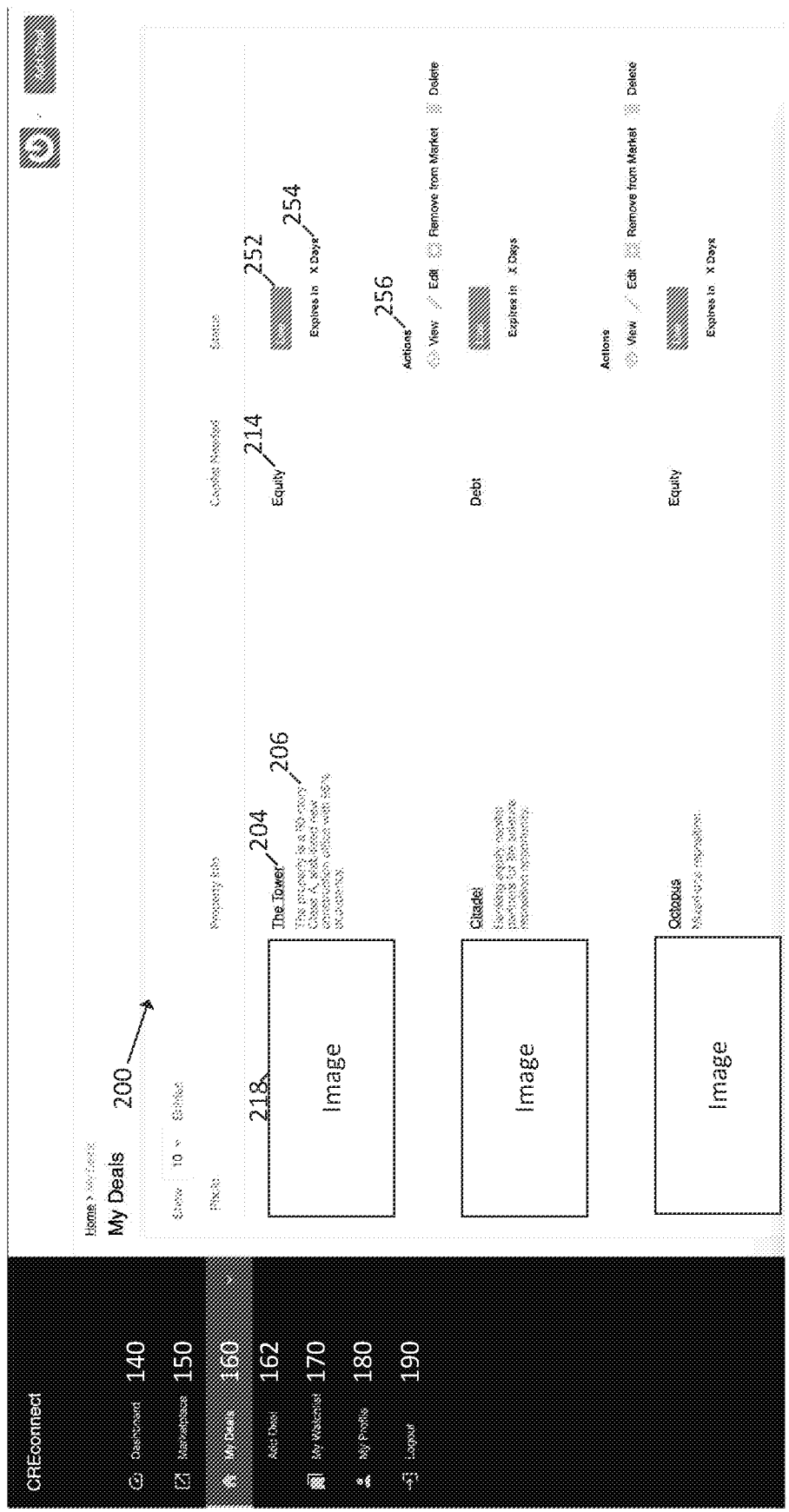
FIG. 20 illustrates a user's deals of the real estate networked platform of FIG. 1.

As discussed above, property post 200 (FIG. 4) can include one or more property features based on one or more saved property features 300 (FIGS. 21-27), FIG. 20 shows an add deal 162 button accessible via my deals 160 to characteristic one or more saved property features 300 according to an exemplary embodiment. My deals 160 shows deals of the user that are stored on real estate networked platform 100 (FIG. 1). The deals may include active, paused, and pending deals.

FIGS. 16-19 illustrate a flowchart of a method 1600 for searching for a property according to an exemplary embodiment. Method 1600 can include one or more of the exemplary embodiments described herein.

At step 1601, method 1600 can receive a plurality of property features corresponding to a property, the plurality of property features comprising a general user characteristic corresponding to a general user, a gallery characteristic corresponding to one or more images of the property, a property type characteristic corresponding to a property usage for the property, a looked-for user characteristic corresponding to a second user, and a looked-for resource characteristic corresponding to the second user. The looked-for user characteristic can be an equity resource user. The second user can be an equity resource user.

At step 1602, method 1600 can store the plurality of property features corresponding to the property in a database.

At step 1603, method 1600 can receive a plurality of privacy features corresponding to the property and the general user, the plurality of privacy features comprising a first visibility characteristic corresponding to the looked-for user type characteristic and a second visibility characteristic corresponding to the looked-for resource characteristic.

At step 1604, method 1600 can store the plurality of privacy features corresponding to the property in the database.

At step 1605, method 1600 can receive a plurality of second user features corresponding to the second user, the second user features comprising a second user type characteristic and a second user resource characteristic. The second user resource characteristic can include a resource value. The looked-for resource characteristic can be a range comprising the resource value.

At step 1606, method 1600 can store the plurality of second user features corresponding to the second user in the database.

At step 1607, method 1600 can generate a private interface based on the plurality of property features, the private interface comprising a property post based on the plurality of property features, the private interface being visible to the second user, the plurality of privacy features configured to limit visibility of the property post in the private interface. Step 1607 can include steps 1608-1610. At step 1608, method 1600 can verify the plurality of property features was stored within a threshold time period. At step 1609, method 1600 can generate the property post based on the verification. At step 1610, method 1600 can remove the property post from the private interface when the threshold time period is met.

At step 1611, method 1600 can associate the stored plurality of privacy features with the stored plurality of property features in the database.

At step 1612, method 1600 can arrange the stored plurality of second user features in the database such that the stored plurality of second user features can be associated with the stored plurality of privacy features and the stored plurality of property features in the database.

At step 1613, method 1600 can associate the first visibility characteristic with the second user type characteristic, and the second visibility characteristic with the second user resource characteristic in the database.

At step 1614, method 1600 can reveal the property post to the second user in the private interface such that the property post is visible to the second user in the private interface. The first visibility characteristic can match with the second user type characteristic such that the property post is visible to the second user in the private interface. The second visibility characteristic can match with the second user resource characteristic such that the property post is visible to the second user in the private interface.

Step 1614 can include steps 1615-1616. At step 1615, method 1600 can match the property post with one or more filters for searching for the property, the one or more filters comprising a property type characteristic corresponding to a property usage characteristic for the property. At step 1616, method 1600 can match the property usage with a second user property type characteristic in the database.

At step 1617, method 1600 can receive a plurality of third user features corresponding to a third user, the user features comprising a third user type characteristic and a third user resource characteristic.

At step 1618, method 1600 can store the plurality of third user features corresponding to the third user in the database.

At step 1619, method 1600 can arrange the stored plurality of third user features in the database such that the stored plurality of third user features can be associated with the stored plurality of privacy features and the stored plurality of property features in the database.

At step 1620, method 1600 can associate the first visibility characteristic with the third user type characteristic, and the second visibility characteristic with the third user resource characteristic in the database.

At step 1621, method 1600 can generate a contact form corresponding to the property post, the contact form configured to send a message from the second user to the general user regarding the property. Step 1621 can include steps 1622-1623. At step 1622, method 1600 can receive a plurality of contact form features corresponding to the second user features, the plurality of contact form sender features comprising a name characteristic corresponding to a name of the second user, an address characteristic corresponding to an address of the second user, and a phone number characteristic corresponding to a phone number of the second user. At step 1623, method 1600 can store the plurality of contact form features in a contact form database.

At step 1624, method 1600 can generate impression data corresponding to the property post, the impression data indicating user interaction with the property post, the impression data comprising a first impression data point corresponding to a duration for which a plurality of users on average views the property post in the private interface and a second impression data point corresponding to a number of times the property post is selected in the private interface by the plurality of users. The impression data can be displayed in the private interface.

At step 1625, method 1600 can store the impression data in an impression data database.

At step 1626, method 1600 can store demographic data corresponding to the plurality of users in the second database, the demographic data comprising a plurality of user features corresponding to the plurality of users, the plurality of user features comprising the plurality of second user features.

At 1627, method 1600 can arrange the stored impression data and the stored demographic data in the impression data database to match each of the stored impression data and at least one of the stored demographic data. Step 1627 can include steps 1628-1629. At step 1628, method 1600 can associate the stored impression data with at least one of the stored demographic data to generate related demographic data for the impression data. At step 1629, method 1600 can reveal the impression data and the related demographic data for the impression data to the general user.

Figure 21:
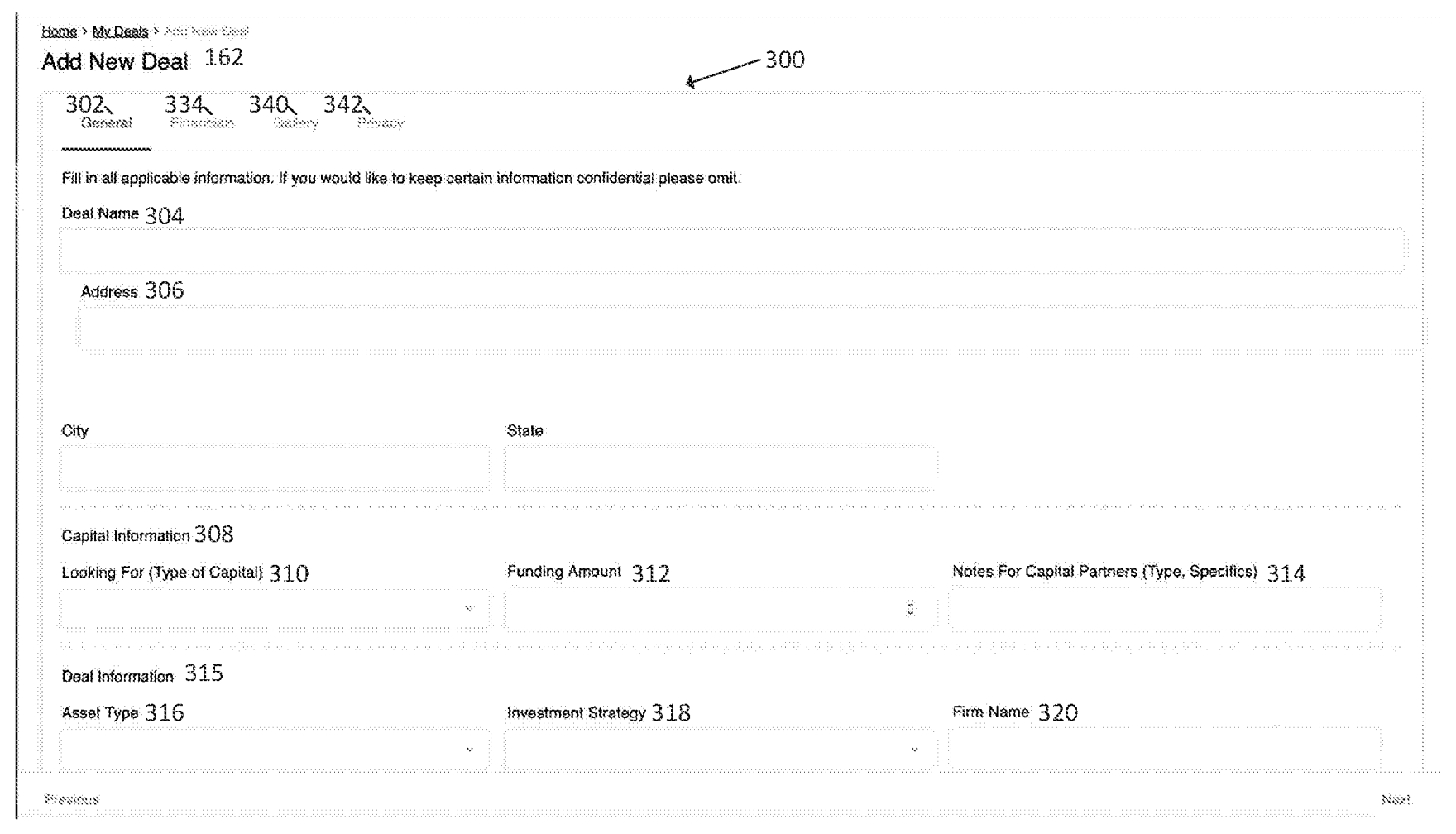
Figure 23:
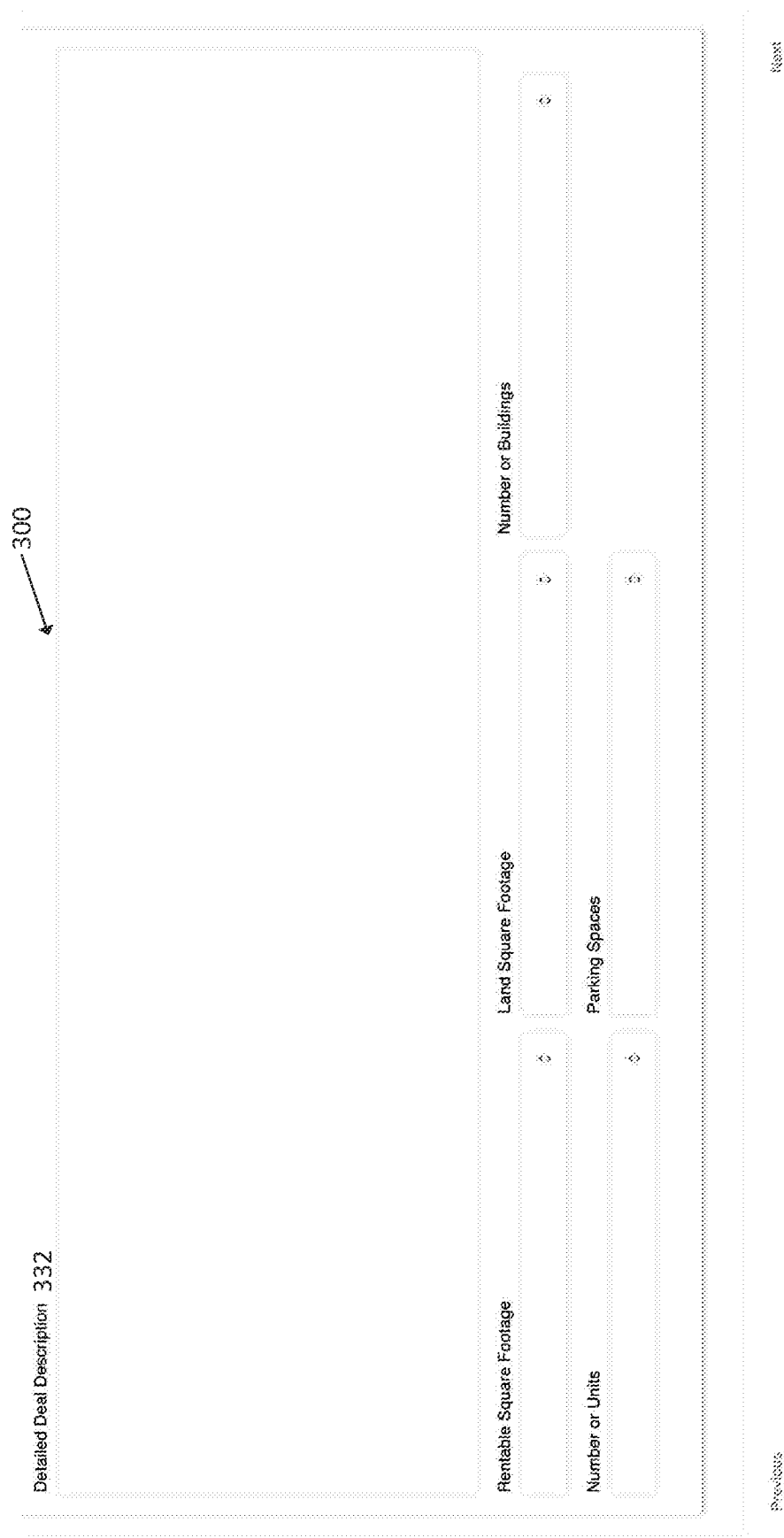
FIG. 23 illustrates the add deal interface of FIG. 21.

FIGS. 21-23 show a general tab 302 that can include one or more saved property features 300 corresponding to one or more property features of property posts 200, shown in FIGS. 4 and 9, for example. General tab 302 can receive, for example, a deal name characteristic 304 corresponding to property 204, an address characteristic 306 corresponding to location 208, resource, or capital, information 308, and deal information 315. Resource information can include a looked-for user type characteristic 310 corresponding to looked-for user type 214, a looked-for resource characteristic 312 corresponding to looked-for resource amount 216, and notes for resource users characteristic 314 corresponding to looked-for limited user entity 215. Deal information 315 can include an asset type characteristic 316 corresponding to property type 210, a rentable square footage characteristic 317 corresponding to rentable square footage 205, an investment strategy characteristic 318 corresponding to investment strategy 212, a land square footage characteristic 319 corresponding to land area 201, a firm name characteristic 320 corresponding to general user 202, a current FAR characteristic 321 corresponding to current FAR 209, an occupancy characteristic 322, a buildable FAR characteristic 323 corresponding to buildable FAR 211, a WALT characteristic 324 corresponding to WALT 203, a number of buildings characteristic 325 corresponding to buildings 217, a parking spaces characteristic 326 corresponding to parking 219, a zoning characteristic 327 corresponding to zoning 207, a number of units characteristic 329 corresponding to units 221, and a description characteristic 328 corresponding to description 206, where description characteristic 322 can include a summary deal description characteristic 330 and a detailed deal description characteristic 332.

Figure 25:
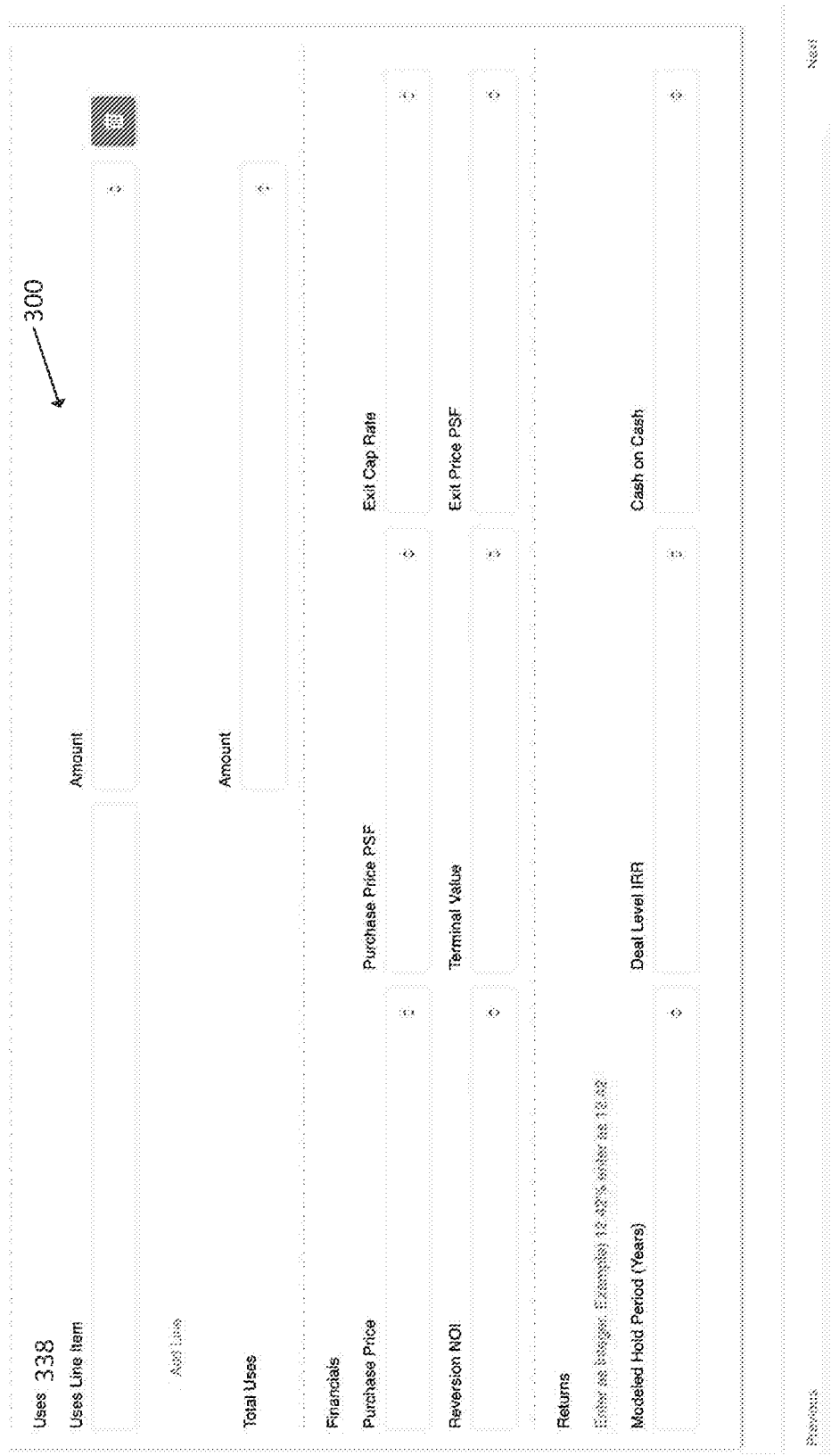
FIG. 25 illustrates the add deal interface of FIG. 21.

FIGS. 24-25 show a financials tab 334 that can include one or more saved property features 300 corresponding to one or more property features of property posts 200, shown in FIG. 10, for example. Financials tab 334 can receive, for example, a sources characteristic 335 corresponding to sources 226 of financing for property 204 (FIG. 9) and a uses characteristic 338 corresponding to uses 228 of financing.

Figure 26:
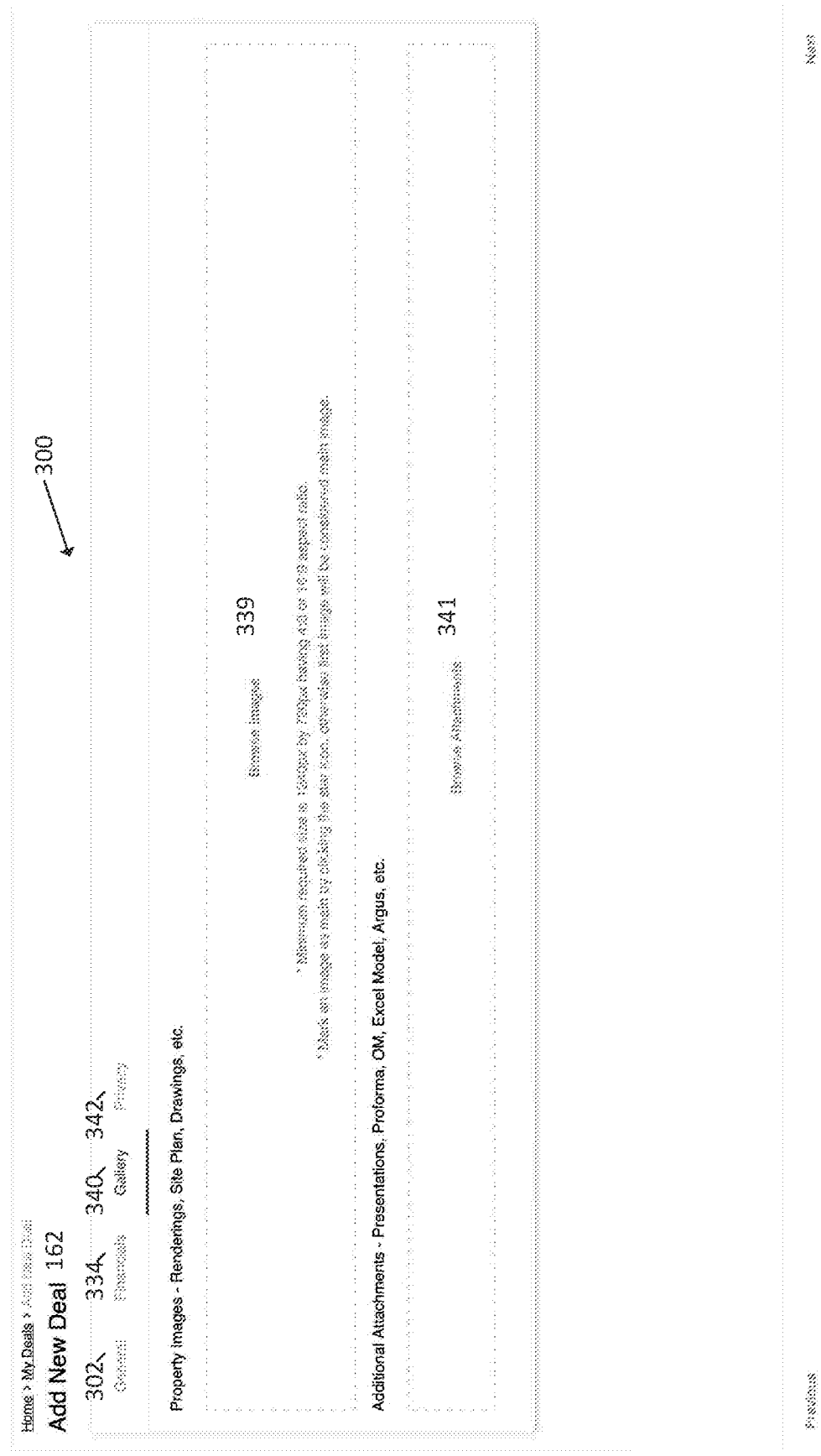
FIG. 26 illustrates the add deal interface of FIG. 21.

FIG. 26 shows a gallery tab 340 that can include one or more saved property features 300 corresponding to one or more property features of property posts 200, shown in FIGS. 8 and 11, for example. Gallery tab 340 can receive, for example, one or more images 339 corresponding to images 218 and one or more attachments 341 corresponding to deal files 232.

FIG. 27 shows a privacy tab 343 that can include one or more saved property features 300. Privacy tab 343 can include one or more saved privacy features 344. Saved privacy features 344 can include first visibility characteristic 346 and second visibility characteristic 348. First visibility characteristic 346 can indicate to which users a property post 200 (FIG. 4) can be visible in private interface 150 (FIG. 4), e.g., all users, only resource users, equity resource users only, or debt resource users only. Accordingly, first visibility characteristic 346 can correspond to a looked-for user characteristic, which can correspond to property features from property post 200, such as looked-for user type 214 (FIG. 9) and looked-for limited user entity 215 (FIG. 9). Second visibility characteristic 348 can indicate what looked-for resource available to a user can render property post 200 visible in private interface 150. Accordingly, second visibility characteristic 348 can correspond to a looked-for resource characteristic, which can correspond to property features from property post 200, such as looked-for resource amount 216 (FIG. 9).

Users can add some or all saved property features 300 shown in FIGS. 21-27. To maintain deal confidentiality, users may elect to omit certain saved property features 300. In some cases, a threshold amount of information can be required to publish a property post 200 (FIG. 4).

Saved privacy features 344 can facilitate property post 200 (FIG. 4) being visible in private interface 150 (FIG. 4), indicating a user complies with one or more plurality of privacy features, or is an acceptable limited user 14 (FIG. 2), for the deal described in property post 200, e.g., by complying with one or more of looked-for user type 214 (FIG. 9), looked-for limited user entity 215 (FIG. 9), or looked-for resource amount 216 (FIG. 9). Property post 200 not being visible in private interface 150 can indicate a user does not comply with saved privacy features 344, or is not an acceptable limited user 14, for the deal described in property post 200, e.g., by not complying with one or more of looked-for user type 214 (FIG. 9), looked-for limited user entity 215 (FIG. 9), or looked-for resource amount 216 (FIG. 9).

Users can access my profile 180 to characteristic one or more saved user features 350 (FIG. 28) such that real estate networked platform 100 (FIG. 1) is customized. My profile 180 with one or more saved user features 250 can be utilized by any user role 10 (FIG. 2). Any of saved user features 250 can be used to prepopulate other fields, e.g., contact form 240 (FIGS. 9-11).

As shown in FIG. 28 according to an exemplary embodiment, a user can provide a photo characteristic 352, a name characteristic 356, a firm name characteristic 358, a title characteristic 360, a phone number characteristic 362, a bio characteristic 364, a location characteristic 366, a website characteristic 368, and a password characteristic 370. Firm name characteristic 358 can correspond to general user characteristic 320 if the user is general user 12 (FIG. 2). Via my profile 180, users can indicate their user role 10 (FIG. 2) and looked-for resource that can correspond with one or more of looked-for user type 214 (FIG. 9), looked-for limited user entity 215 (FIG. 9), or looked-for resource amount 216 (FIG. 9). In this way, real estate networked platform 100 (FIG. 1) can generate private interface 150 (FIG. 4) and property post 200 (FIG. 4) visibility based on one or more user features 350 corresponding with property features in property post 200. Users can characteristic any additional or alternative user features 350 based on which private interface 150 can be generated with varying property post 200 visibility. For example, users can indicate they are interested in a particular property type, e.g., multifamily, industrial, mixed use, office, retail, life science, medical office, hotel and hospitality, self storage, land, or single family. In this way, private interface 150 can preclude visibility of alternate property types, and property type filter 154 (FIG. 6) can show only the preferred property types.

A limited user 14 (FIG. 2) can characteristic their typical deal size in my profile 180, or another interface of real estate networked platform 100 (FIG. 1). For example, limited user 14 can indicate their typical deal size is a range, such as $100 million to $300 million. Accordingly, limited user 14 may only be able to view property posts 200 (FIG. 4) for which general user 12 (FIG. 2) is seeking a looked-for resource amount 216 (FIG. 9) within a range of $100 million to $300 million. Limited user 12 would not be able to view property posts 200 for which general user 12 is seeking a looked-for resource amount 216 greater than $300 million. In other words, limited user 12 can view only property posts 200 sourcing a looked-for resource amount 216 within their deal size range, and cannot view property posts 200 sourcing a looked-for resource amount 216 above or below their deal size range.

The one or more user features 350 (FIG. 28) can be self-reported. A typical deal size of the user, for example, can be a profile detail 350 that is self-reported. In other cases, the one or more user features 350 can be verified by contacting the user. Real estate networked platform 100 (FIG. 1) can also require a credit investor verification in the terms of use. In this way, brokers, or other parties that can interrupt the connection facilitated by real estate networked platform 100 can be prevented from obtaining access to real estate networked platform 100 and disturbing the user experience.

Via private interface 150 (FIG. 4), for example, or another interface of real estate networked platform 100 (FIG. 1), users can view profiles of other users. For example, from private interface 150, a limited user 14 (FIG. 2) can view a general user 12 (FIG. 2) profile to see various deals available from general user 12.

Figure 29:
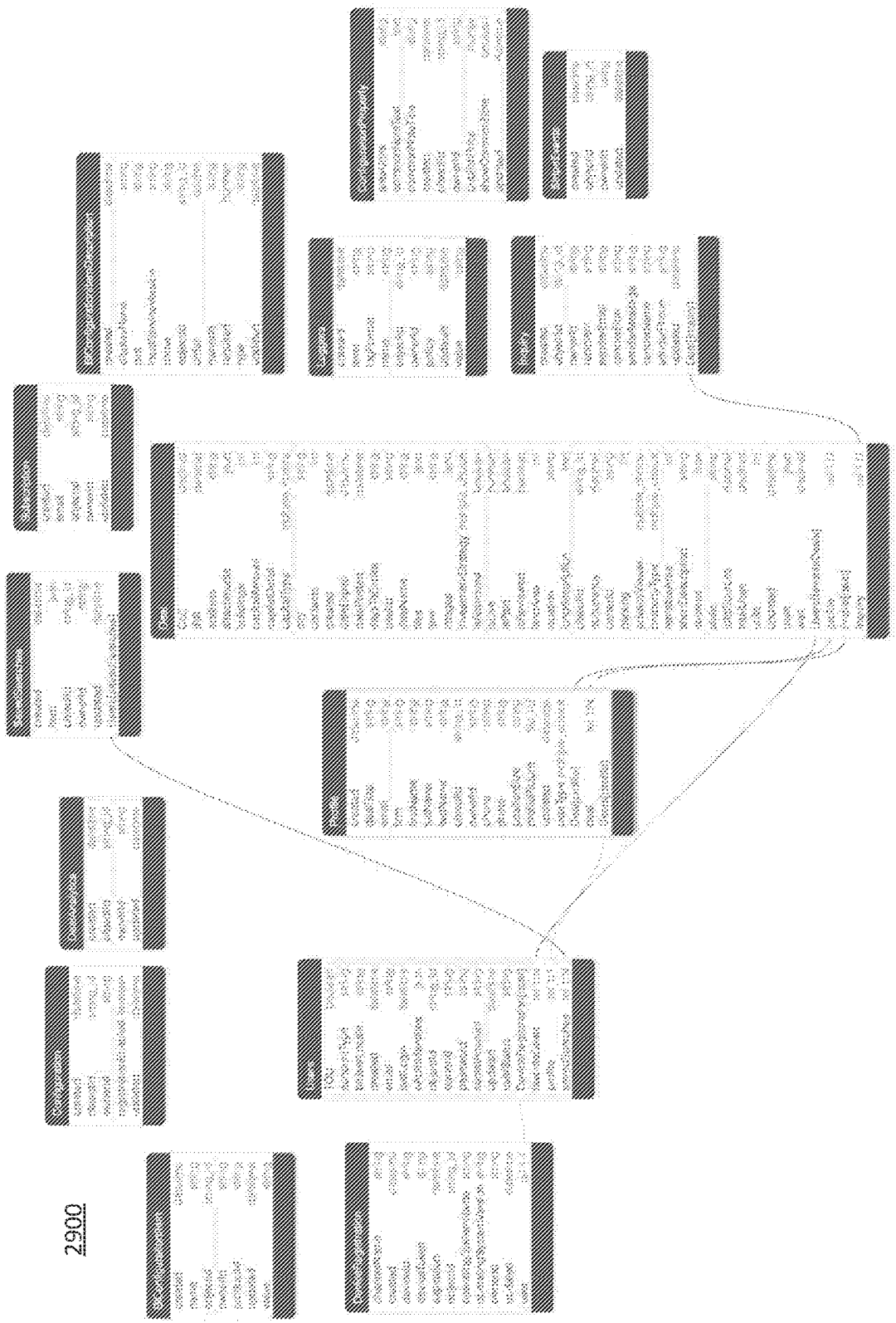
FIG. 29 illustrates a backend structure of the real estate networked platform of FIG. 1.

FIG. 29 shows backend system 2900 according to an exemplary embodiment. Backend system 2900 can store the information described herein provided by various users, e.g., saved property features 300 (FIGS. 21-27), saved privacy features 344 (FIG. 27), saved user features 350 (FIG. 28), investment history and identity authentication information, etc. Backend system 2900 can facilitate the communication described herein to generate real estate networked platform 100 (FIG. 1). As shown, characteristics described herein are tagged and generate the described outputs. Backend system 2900 can verify or review one or more aspects of real estate networked platform 100 (FIG. 1). Property posts 200 (FIG. 4), for example, can be reviewed before being published via a backend tag. The accuracy of saved property features 300 (FIGS. 21-27) may not be verified because of risk and to maintain privacy for a deal and general user 12 (FIG. 2). However, the review can include verifying that a threshold amount of saved property features 300 (FIGS. 21-27) is provided, or that saved property features 300 (FIGS. 21-27) appear reasonable and not arbitrary. Backend system 2900 can include the databases described in method 1600 (FIGS. 16-19).

Figure 30:
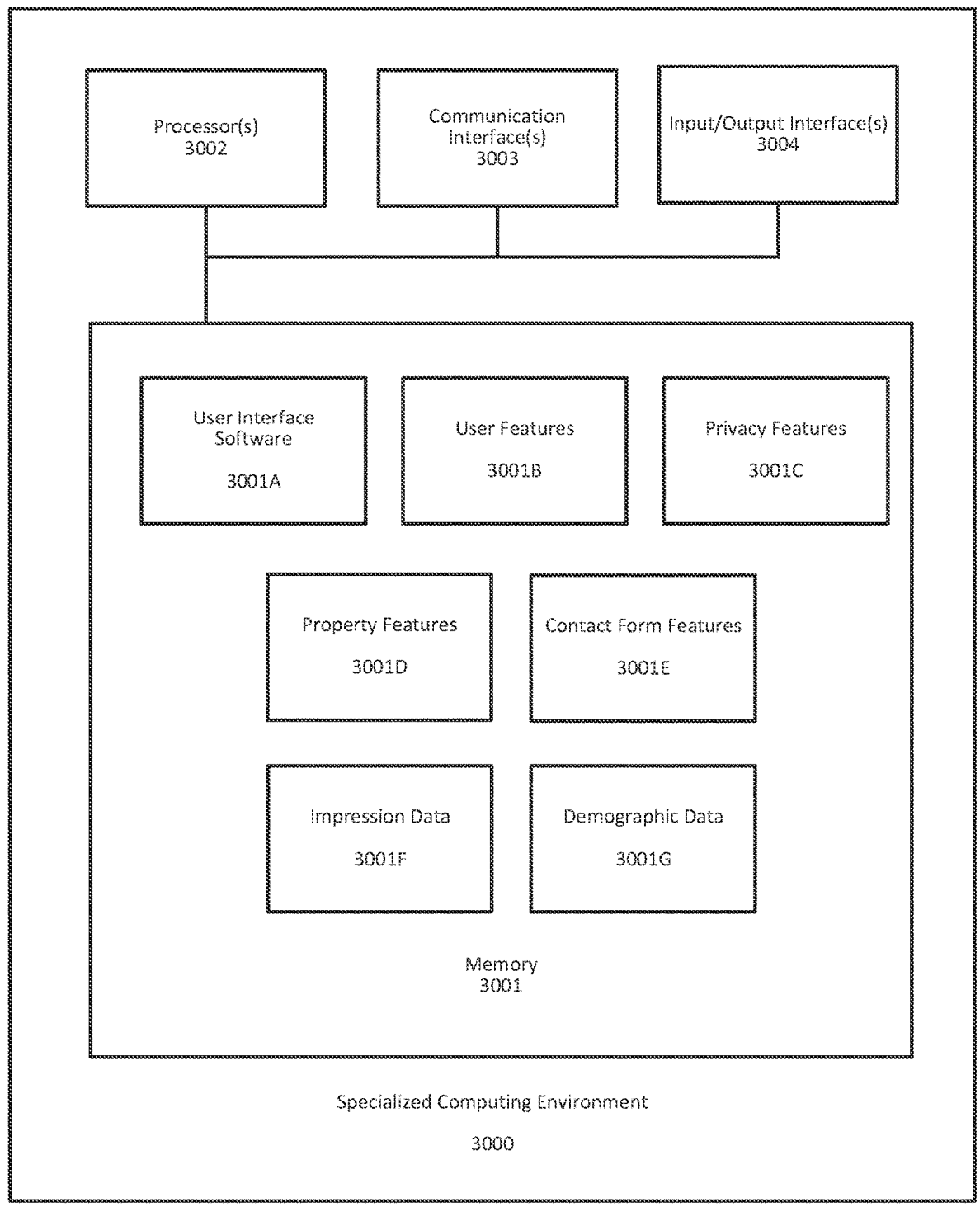
FIG. 30 illustrates the components of the specialized computing environment configured to perform the specialized method of searching for a property according to an exemplary embodiment.

FIG. 30 illustrates the components of a specialized computing environment 3000 configured to perform the specialized processes described herein. Specialized computing environment 3000 is a computing device that includes a memory 3001 that is a non-transitory computer-readable medium and can be volatile memory (e.g., registers, cache, RAM), non-volatile memory (e.g., ROM, EEPROM, flash memory, etc.), or some combination of the two.

As shown in FIG. 30, memory 3001 can include user interface software 3001A, user features 3001B, privacy features 3001C, property features 3001D, contact form features 3001E, impression data 3001F, and demographic data 3001G, as well as any other components required to perform the methods described herein. Each of the software components in memory 3001 store specialized instructions and data structures configured to perform the corresponding functionality and techniques described herein.

All of the software stored within memory 3001 can be stored as a computer-readable instructions, that when executed by one or more processors 3002, cause the processors to perform the functionality described with respect to FIGS. 1-29.

Processor(s) 3002 execute computer-executable instructions and can be a real or virtual processors. In a multi-processing system, multiple processors or multicore processors can be used to execute computer-executable instructions to increase processing power and/or to execute certain software in parallel.

Specialized computing environment 3000 additionally includes a communication interface 3003, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 3000 further includes characteristic and output interfaces 1304 that allow users (such as system administrators) to provide characteristic to the system to set parameters, to edit data stored in memory 3001, or to perform other administrative functions.

An interconnection mechanism (shown as a solid line in FIG. 30), such as a bus, controller, or network interconnects the components of the specialized computing environment 1300.

Characteristic and output interfaces 3004 can be coupled to characteristic and output devices. For example, Universal Serial Bus (USB) ports can allow for the connection of a keyboard, mouse, pen, trackball, touch screen, or game controller, a voice characteristic device, a scanning device, a digital camera, remote control, or another device that provides characteristic to the specialized computing environment 3000.

Specialized computing environment 3000 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 3000.

What is claimed is:

1. A method executed by one or more computing devices of searching for a real estate property based on matching user, privacy, and property features, the method comprising:

receiving, from a general user, via at least one processor of the one or more computing devices, a plurality of property features corresponding to a property, the plurality of property features comprising a general user characteristic corresponding to the general user, a gallery characteristic corresponding to one or more images of the property, a property type characteristic corresponding to a property usage for the property, a looked-for user characteristic corresponding to a second user, and a looked-for resource characteristic corresponding to the second user;

storing, via the at least one processor, the plurality of property features corresponding to the property in a database;

receiving, from the general user, via the at least one processor, a plurality of privacy features corresponding to the property and the general user, the plurality of privacy features comprising a first visibility characteristic corresponding to the looked-for user type characteristic and a second visibility characteristic corresponding to the looked-for resource characteristic;

storing, via the at least one processor, the plurality of privacy features corresponding to the property in the database;

receiving, from the second user, via the at least one processor, a plurality of second user features corresponding to the second user, at least one of the plurality of the second user features comprising a second user type characteristic and a second user resource characteristic;

storing, via the at least one processor, the plurality of second user features corresponding to the second user in the database;

determining, via the at least one processor, the second user is an acceptable second user based on (i) associating the stored plurality of privacy features with the stored plurality of property features in the database, (ii) associating the first visibility characteristic with the second user type characteristic, and (iii) associating the second visibility characteristic with the second user resource characteristic;

generating, via the at least one processor, a private interface based on the plurality of property features, the private interface configured to facilitate connection between the general user and the acceptable second user for capitalizing a deal regarding the property, the private interface comprising a marketplace tab and a separate watchlist tab, the marketplace tab comprising at least one icon for a property post based on the plurality of property features, the property post icon on the private interface being visible to the acceptable second user for a predetermined period of time, wherein after the predetermined period of time the property post icon is not visible if a precondition is satisfied, the plurality of privacy features configured to limit visibility of the property post icon in the private interface such that-only the acceptable second user is able to view the property post icon in order to maintain privacy for the deal;

determining, via the at least one processor, the acceptable second user saved the property post icon on the marketplace tab; and transposing, via the at least one processor, the property post icon from the marketplace tab to the watchlist tab, wherein the property post icon is removed from the watchlist tab such that the property post icon is not visible in the watchlist tab to the acceptable second user if the precondition is satisfied.

2. The method of claim 1, further comprising:
receiving, from a third user, via the at least one processor, a plurality of third user features corresponding to the third user, the user features comprising a third user type characteristic and a third user resource characteristic; and
storing, via the at least one processor, the plurality of third user features corresponding to the third user in the database,
wherein the private interface is visible to the third user.

3. The method of claim 2, further comprising:
determining, via the at least one processor, the third user is not an acceptable third user based on (i) associating the stored plurality of privacy features with the stored plurality of property features in the database, (ii) associating the first visibility characteristic with the third user type characteristic, and (iii) not associating the second visibility characteristic with the third user resource characteristic such that the property post icon is not visible to the third user in the private interface in the database.

4. The method of claim 2, further comprising:
determining, via the at least one processor, the third user is not an acceptable third user based on (i) associating the stored plurality of privacy features with the stored plurality of property features in the database, (ii) not associating the first visibility characteristic with the third user type characteristic, and (iii) associating the second visibility characteristic with the third user resource characteristic such that the property post icon is not visible to the third user in the private interface in the database.

5. The method of claim 2, further comprising:
determining, via the at least one processor, the third user is an acceptable third user based on (i) associating the stored plurality of privacy features with the stored plurality of property features in the database, (ii) associating the first visibility characteristic with the third user type characteristic, and (iii) associating the second visibility characteristic with the third user resource characteristic such that the property post icon is visible to the third user in the private interface.

6. The method of claim 1, further comprising:
Generating, via the at least one processor, a contact form corresponding to the property post, the contact form configured to send a message from the acceptable second user to the general user regarding the property.

7. The method of claim 6, wherein generating a contact form corresponding to the property post comprises:
receiving, via the at least one processor, a plurality of contact form sender features corresponding to the second user features, the plurality of contact form sender features comprising a name characteristic corresponding to a name of the second user, an address characteristic corresponding to an address of the second user, and a phone number characteristic corresponding to a phone number of the second user; and
storing, via the at least one processor, the plurality of contact form sender features in a contact form database,
wherein the second user features further comprise the name, the address, and the phone number of the second user.

8. The method of claim 1, wherein the looked-for user characteristic is an equity resource user, and
wherein the second user is an equity resource user.

9. The method of claim 1, wherein the second user resource characteristic comprising a resource value, and
wherein the looked-for resource characteristic is a range comprising the resource value.

10. The method of claim 1, wherein generating a private interface based on the one or more property features comprises:
verifying, via the at least one processor, the plurality of property features was stored within a threshold time period; and
generating, via the at least one processor, the property post icon based on the verification.

11. The method of claim 10, further comprising:
removing, via the at least one processor, the property post icon from the private interface when the threshold time period is met.

12. The method of claim 1, further comprising:
generating, via the at least one processor, impression data corresponding to the property post icon, the impression data indicating user interaction with the property post icon, the impression data comprising a first impression data point corresponding to a duration for which a plurality of users on average views the property post icon in the private interface and a second impression data point corresponding to a number of times the property post icon is selected in the private interface by the plurality of users; and
storing, via the at least one processor, the impression data in an impression data database,
wherein the acceptable second user is one of the plurality of users, and
wherein selecting the property post icon in the private interface displays the plurality of property features.

13. The method of claim 12, wherein the impression data is displayed in the private interface.

14. The method of claim 12, further comprising:
storing, via the at least one processor, demographic data corresponding to the plurality of users in the second database, the demographic data comprising a plurality of user features corresponding to the plurality of users, the plurality of user features comprising the plurality of second user features;

associating, via the at least one processor, the stored impression data with at least one of the stored demographic data to generate related demographic data for the impression data; and revealing, via the at least one processor, the impression data and the related demographic data for the impression data to the general user.

15. The method of claim 1, wherein the private interface comprises a filter such that upon activation of the filter the second acceptable user can search within the private interface.

16. The method of claim 1, wherein the precondition being satisfied comprises a monetary payment not being received within the predetermined period of time.

17. The method of claim 1, further comprising:
collecting, via the at least one processor, first usage data for the general user, the first usage data comprising a first value for the precondition during the predetermined period of time;
comparing, via the at least one processor, the collected first usage data to second usage data for the general user, the second usage data comprising a second value for the precondition after the predetermined period of time; and
collecting, via the at least one processor, third usage data for the general user based on the second value indicating the precondition is not satisfied, the third usage data comprising an investment history of the general user indicating a deal was closed.

18. The method of claim 17, further comprising:
generating, via the at least one processor, first impression data related to the property post icon;
generating, via the at least one processor, a verification token based on the investment history of the general user; and
generating, via the at least one processor, second impression data related to the property post icon, the second impression data being greater than the first impression data based on the verification token.

19. An apparatus for searching for a real estate property based on matching user, privacy, and property features comprising:
one or more processors; and
one or more memories coupled to at least one of the one or more processors, the one or more memories comprising computer readable instructions stored thereon that, when executed by at least one of the one or more processors, cause at least one of the one or more processors to:
receive, from a general user, a plurality of property features corresponding to a property, the plurality of property features comprising a general user characteristic corresponding to the general user, a gallery characteristic corresponding to one or more images of the property, a property type characteristic corresponding to a property usage for the property, a looked-for user characteristic corresponding to a second user, and a looked-for resource characteristic corresponding to the second user;
store the plurality of property features corresponding to the property in a database;
receive, from the general user, a plurality of privacy features corresponding to the property and the general user, the plurality of privacy features comprising a first visibility characteristic corresponding to the looked-for user type characteristic and a second visibility characteristic corresponding to the looked-for resource characteristic;
store the plurality of privacy features corresponding to the property in the database;
receive, from the second user, a plurality of second user features corresponding to the second user, at least one of the plurality of the second user features comprising a second user type characteristic and a second user resource characteristic;
store the plurality of second user features corresponding to the second user in the database;
determine the second user is an acceptable second user based on (i) associating the stored plurality of privacy features with the stored plurality of property features in the database, (ii) associating the first visibility characteristic with the second user type characteristic, and (iii) associating the second visibility characteristic with the second user resource characteristic;
generate a private interface based on the plurality of property features, the private interface configured to facilitate connection between the general user and the acceptable second user for capitalizing a deal regarding the property, the private interface comprising a marketplace tab and a separate watchlist tab, the marketplace tab comprising at least one icon for a property post based on the plurality of property features, the property post icon on the private interface being visible to the acceptable second user for a predetermined period of time, wherein after the predetermined period of time the property post icon is not visible if a precondition is satisfied, the plurality of privacy features configured to limit visibility of the property post icon in the private interface such that the acceptable second user is able to view the property post icon in order to maintain privacy for the deal;
determine, via the at least one processor, the acceptable second user saved the property post icon on the marketplace tab; and
transpose the property post icon from the marketplace tab to the watchlist tab, wherein the property post icon is removed from the watchlist tab such that the property post icon is not visible in the watchlist tab to the acceptable second user if the precondition is satisfied.

20. At least one non-transitory computer-readable medium storing computer-readable instructions for searching for a real estate property based on matching user, privacy, and property features that, when executed by one or more computing devices, cause at least one of the one or more computing devices to:
receive, from a general user, a plurality of property features corresponding to a property, the plurality of property features comprising a general user characteristic corresponding to the general user, a gallery characteristic corresponding to one or more images of the property, a property type characteristic corresponding to a property usage for the property, a looked-for user characteristic corresponding to a second user, and a looked-for resource characteristic corresponding to the second user;
store the plurality of property features corresponding to the property in a database;
receive, from the general user, a plurality of privacy features corresponding to the property and the general user, the plurality of privacy features comprising a first visibility characteristic corresponding to the looked-for user type characteristic and a second visibility characteristic corresponding to the looked-for resource characteristic;

store the plurality of privacy features corresponding to the property in the database;

receive, from the second user, a plurality of second user features corresponding to the second user, at least one of the plurality of the second user features comprising a second user type characteristic and a second user resource characteristic;

store the plurality of second user features corresponding to the second user in the database;

determine the second user is an acceptable second user based on (i) associating the stored plurality of privacy features with the stored plurality of property features in the database, (ii) associating the first visibility characteristic with the second user type characteristic, and (iii) associating the second visibility characteristic with the second user resource characteristic;

generate a private interface based on the plurality of property features, the private interface configured to facilitate connection between the general user and the acceptable second user for capitalizing a deal regarding the property, the private interface comprising a marketplace tab and a separate watchlist tab, the marketplace tab comprising at least one icon for a property post based on the plurality of property features, the property post icon on the private interface being visible to the acceptable second user for a predetermined period of time, wherein after the predetermined period of time the property post icon is not visible if a precondition is satisfied, the plurality of privacy features configured to limit visibility of the property post icon in the private interface such that-only the acceptable second user is able to view the property post icon in order to maintain privacy for the deal;

determine, via the at least one processor, the acceptable second user saved the property post icon on the marketplace tab; and transpose the property post icon from the marketplace tab to the watchlist tab, wherein the property post icon is removed from the watchlist tab such that the property post icon is not visible in the watchlist tab to the acceptable second user if the precondition is satisfied.

* * * * *